United States Patent [19]
Ikushima et al.

[11] Patent Number: 5,821,314
[45] Date of Patent: Oct. 13, 1998

[54] THERMOSETTING COMPOSITIONS AND METHODS OF FORMING A FINISH COAT

[75] Inventors: Satoshi Ikushima, Hiratsuka; Yasumasa Okumura, Yokohama; Osamu Isozaki, Yokohama; Minoru Tsunoda, Yokohama, all of Japan

[73] Assignee: Kansai Paint Company, Limited, Amagasaki, Japan

[21] Appl. No.: 750,468

[22] PCT Filed: Jun. 15, 1995

[86] PCT No.: PCT/JP95/01198

§ 371 Date: Dec. 13, 1996

§ 102(e) Date: Dec. 13, 1996

[87] PCT Pub. No.: WO95/35336

PCT Pub. Date: Dec. 28, 1995

[30] Foreign Application Priority Data

| Jun. 17, 1994 | [JP] | Japan | 6-135305 |
|---|---|---|---|
| Jun. 17, 1994 | [JP] | Japan | 6-135384 |
| Jun. 24, 1994 | [JP] | Japan | 6-142806 |
| Jun. 24, 1994 | [JP] | Japan | 6-142950 |
| Jun. 24, 1994 | [JP] | Japan | 6-142952 |
| Jun. 27, 1994 | [JP] | Japan | 6-144379 |
| Jul. 4, 1994 | [JP] | Japan | 6-152324 |
| Jul. 4, 1994 | [JP] | Japan | 6-152352 |

[51] Int. Cl.$^6$ .................................................. C08G 77/00

[52] U.S. Cl. .......................... 528/18; 524/284; 524/356; 524/366; 524/379; 524/588; 525/104; 525/437; 525/438; 525/487; 528/40; 526/279

[58] Field of Search ........................ 528/18, 40; 525/104, 525/437, 438, 487; 526/279; 524/284, 366, 356, 379, 588

[56] References Cited

U.S. PATENT DOCUMENTS

| 5,166,265 | 11/1992 | Nakahata et al. | 525/101 |
|---|---|---|---|
| 5,175,057 | 12/1992 | Wengrovius et al. | 528/18 |
| 5,213,899 | 5/1993 | Lucas | 528/18 |

FOREIGN PATENT DOCUMENTS

| 51-50941 | 5/1976 | Japan . |
|---|---|---|
| 52-135673 | 11/1977 | Japan . |
| 54-71133 | 6/1979 | Japan . |
| 57-65722 | 4/1982 | Japan . |
| 57-100135 | 6/1982 | Japan . |
| 57-159813 | 10/1982 | Japan . |
| 59-115366 | 7/1984 | Japan . |
| 61-127728 | 6/1986 | Japan . |
| 62-1723 | 1/1987 | Japan . |
| 62-172016 | 7/1987 | Japan . |
| 2-73825 | 3/1990 | Japan . |
| 2-233717 | 9/1990 | Japan . |
| 2-251521 | 10/1990 | Japan . |
| 3-76771 | 4/1991 | Japan . |
| 3-172318 | 7/1991 | Japan . |
| 3-263421 | 11/1991 | Japan . |
| 4-100881 | 4/1992 | Japan . |
| 4-292616 | 10/1992 | Japan . |
| 4-325579 | 11/1992 | Japan . |

*Primary Examiner*—Melvyn I. Marquis
*Attorney, Agent, or Firm*—Armstrong, Westerman, Hattori, McLeland & Naughton

[57] ABSTRACT

This invention provides a thermosetting composition comprising (A) a compound (A-1) containing an epoxy group or groups and a reactive silicon group or groups as essential functional group components in the same molecule, or a mixture (A-2) of an epoxy group-containing compound and a reactive silicon group-containing compound, and (B) an organotin catalyst, a thermosetting composition comprising (A) a compound (A-3) containing (i) an epoxy group or groups, (ii) a reactive silicon group or groups and (iii) a hydroxyl group or groups and/or a carboxyl group or groups as essential functional group components in the same molecule, or a mixture (A-4) of at least two types of compounds, each compound containing at least one member selected from the class consisting of functional group components (i) to (iii), and all of the functional group components (i) to (iii) being present in said mixture, and (B) an organotin catalyst; and methods of forming a finish coat using these thermosetting compositions. The thermosetting compositions of the invention is excellent in storage stability, curable at low temperatures, and capable of producing cured products free of discoloration. The coating methods of the invention can form coating films superior in low-temperature curability, finished appearance, acid resistance, scratch resistance, and weatherability.

10 Claims, No Drawings

THERMOSETTING COMPOSITIONS AND METHODS OF FORMING A FINISH COAT

FIELD OF THE INVENTION

The present invention relates to novel thermosetting compositions and methods of forming a finish coat using said thermosetting compositions.

BACKGROUND ART

Known curing catalysts for epoxy resins include Lewis acid (e.g. aluminum chloride, tin chloride, boron fluoride, boron fluoride ether complex, etc.), metal alcoholate (e.g. aluminum trialkoxide, titanium tetraalkoxide, etc.), aluminum chelate (e.g. trisacetylacetonatoaluminum, etc.), a reaction product of aluminum chelate and active hydrogen compound (reaction product of trisacetylacetonatoaluminum with silanol compound) and the like.

However, a curable composition containing the Lewis acid or metal alcoholate as the catalyst has drawbacks of being pronouncedly low in storage stability at room temperature, and a curable composition containing the aluminum chelate or the reaction product thereof as the catalyst has drawbacks of being low in storage stability at room temperature and giving a cured product which yellows.

Consequently there exists a need for curable compositions which are free from these drawbacks and which are excellent in storage stability, low temperature curability, resistance to discoloration and so on.

In recent years, the environment has been attacked by air pollution, and acid rain has inflicted damages such as withering of woods, thereby posing a serious social problem. Another problem is that coating films on articles for outdoor use such as automotive exterior panels suffer etching, blushing, staining, etc. Accordingly, there is a great need for highly acid resistant coating films.

Finish coats such as those formed on automotive exterior panels readily become marred on collision with, e.g. sand or dust during travel or on friction with washer brushes. Such mar is one of the factors which impair the appearance of the coating film. Especially scratches are likely to stand out in coating films of dark colors, e.g. black, dark blue or brown. Therefore, there is a marked need for the improvement of scratch resistance in finish coats.

At present, there are widely carried out methods of forming a finish coat using an amino-curable coating composition comprising a hydroxyl group-containing resin and an amino resin as a binder. Yet, finish coats which are satisfactory in both of acid resistance and scratch resistance are still unavailable.

Methods of forming a finish coat using other compositions than said amino-curable coating compositions, e.g. coating compositions comprising an epoxy group- and a hydroxyl group-containing resin and a cyclic anhydride such as methylhexahydrophthalic anhydride as a curing agent are disclosed in Japanese Unexamined Patent Publications No. 84673/1988 and No. 84674/1988. However, the disclosed methods are defective in forming finish coats which are inferior in finished appearance, acid resistance, scratch resistance, etc.

An object of the present invention is to provide a curable composition which is excellent in storage stability, curable at low temperatures and capable of forming a cured product free of discoloration.

Another object of the invention is to provide a method of forming a finish coat, the method having overcome the drawbacks of said conventional methods of forming a finish coat and the method being capable of forming a finish coat which is excellent in low temperature curability, finished appearance, acid resistance, scratch resistance, weather resistance, etc.

DISCLOSURE OF THE INVENTION

The present inventors conducted extensive research to achieve said objects and found the following. When a curable composition contains an organotin catalyst as a reaction catalyst in addition to the components for a composition containing epoxy groups and reactive silicon groups as essential functional group components or for a composition containing epoxy groups, reactive silicon groups, and hydroxyl groups and/or carboxyl groups as essential functional group components, the resulting curable composition is outstanding in storage stability, low temperature curability and resistance to discoloration. Another discovery was that a coating film free of said prior art drawbacks can be formed when said curable composition is used as a curable coating composition for forming a finish coat in a method of forming a finish coat, the method comprising forming a colored base coat on a substrate and forming a clear topcoat. The present invention was completed based on these novel findings.

According to the present invention, there are provided the following thermosetting compositions and methods of forming a finish coat.

(I) A thermosetting composition comprising (A) a compound (A-1) containing an epoxy group or groups and a reactive silicon group or groups as essential functional group components in the same molecule, or a mixture (A-2) of an epoxy group-containing compound and a reactive silicon group-containing compound, and (B) an organotin catalyst (said thermosetting composition may be hereinafter referred to as "thermosetting composition 1").

(II) A thermosetting composition comprising (A) a compound (A-3) containing (i) an epoxy group or groups, (ii) a reactive silicon group or groups and (iii) a hydroxyl group or groups and/or a carboxyl group or groups as essential functional group components in the same molecule, or a mixture (A-4) of at least two types of compounds, each compound containing at least one member selected from the class consisting of functional group components (i) to (iii), and all of the functional group components (i) to (iii) being present in said mixture, and (B) an organotin catalyst (said thermosetting composition may be hereinafter referred to as "thermosetting composition 2").

(III) A method of forming a finish coat, the method comprising the steps of forming a colored base coat on a substrate and forming a clear topcoat, the method being characterized in that the colored base coat and/or the clear topcoat is formed from a curable coating composition comprising, as the essential components, (A) a compound (A-1) containing an epoxy group or groups and a reactive silicon group or groups as essential functional group components in the same molecule, or a mixture (A-2) of an epoxy group-containing compound and a reactive silicon group-containing compound, (B) an organotin catalyst, and (C) an organic solvent.

(IV) A method of forming a finish coat, the method comprising the steps of forming a colored base coat on a substrate and forming a clear topcoat, the method being characterized in that the colored base coat and/or the clear topcoat is formed from a curable coating composition comprising, as the essential components, (A) a compound (A-3) containing (i) an epoxy group or groups, (ii) a reactive silicon group or groups and (iii) a hydroxyl group or groups and/or a carboxyl group or groups as essential functional group components in the same molecule, or a mixture (A-4) of at least two types of compounds, each compound containing at least one member selected from the class consisting of the functional group components (i) to (iii), and all of the functional group components (i) to (iii) being present in said mixture,
(B) an organotin catalyst, and
(C) an organic solvent.

The reactive silicon group which is present in the thermosetting compositions 1 and 2 of the present invention refers to a silanol group, i.e. a group consisting of a silicon atom and a hydroxyl group directly attached thereto or to a group consisting of a silicon atom and a hydrolyzable group directly attached thereto (a group capable of forming a silanol group on hydrolysis). At least one type of these groups can be present in each of the compounds (A-1) and (A-3) and the mixtures (A-2) and (A-4), all of them containing reactive silicon groups.

Hydrolyzable groups directly attached to silicon atoms in the thermosetting compositions 1 and 2 of the invention include, for example, an alkoxyl group represented by the formula —$OR^1$, an acyloxy group represented by the formula —$OCOR^2$, and a ketoxime group represented by the formula —$ON=C(R^3)_2$. In the foregoing formulas, $R^1$ represents an alkyl group having 1 to 5 carbon atoms, preferably 1 to 3 carbon atoms, such as methyl, ethyl, propyl, butyl and the like, $R^2$ represents an alkyl group having 1 to 3 carbon atoms, and $R^3$ represents an alkyl group having 1 to 5 carbon atoms.

Preferred examples of said hydrolyzable group are an alkoxyl group such as methoxy, ethoxy, propoxy and the like; an acyloxy group such as acetoxy, propionyloxy and the like; and a ketoxime group such as acetoxime, propionyloxime and the like. Among these hydrolyzable groups, preferred is an alkoxyl group having 1 to 3 carbon atoms which shows a good effect in giving superior storage stability and low temperature curability.

The epoxy group in the component (A) of the thermosetting compositions 1 and 2 according to the present invention may be either an aliphatic epoxy group having an ether group attached between the carbon atoms of a straight-chain hydrocarbon group, or an alicyclic epoxy group having an ether group attached between the carbon atoms of an alicyclic hydrocarbon group. When an alicyclic epoxy group exists, cationic polymerization reaction or cationic addition reaction easily and quickly occurs due to the reactive silicon groups in the component (A) and the organotin catalyst as the component (B), with the result that the composition containing such epoxy group has a feature of being excellent in low temperature curability.

Although entirely unreactive at room temperature (about 20° C.), the thermosetting compositions 1 and 2 according to the present invention instantly causes a reaction on heating to about 60° C. Consequently the compositions 1 and 2 are superior in storage stability and low temperature curability and provide cured products with high resistance to discoloration. While the reason for this occurrence remains to be clarified, presumably the organotin catalyst becomes attached to the reactive silicon group-containing compound on exposure to heat, thereby forming a tin-silicon complex which accelerates, as a curing catalyst, the cationic polymerization reaction of epoxy groups or cationic addition reaction thereof.

In the thermosetting composition 2 of the present invention, the reaction of the epoxy groups with the reactive silicon groups is accelerated by the hydroxyl groups in the presence of the organotin catalyst. Thus the hydroxyl groups have an effect of increasing the low temperature curability. The carboxyl groups promote the reaction between the hydroxyl groups and the reactive silicon groups and the reaction of the reactive silicon groups with each other, thereby enhancing the low temperature curability. Further the carboxyl groups react with the epoxy groups to form a cured film excellent in properties such as acid resistance. Furthermore, since the carboxyl groups are consumed in their reaction with the epoxy groups, the carboxyl groups scarcely remain in the coating film, resulting in improvements of water resistance, acid resistance and weather resistance in the coating film.

The components for the thermosetting compositions 1 and 2 of this invention are described below in more detail.

Component (A) of thermosetting composition 1 Compound (A-1) containing an epoxy group or groups and a reactive silicon group or groups as essential functional group components in the same molecule Appropriately the number of epoxy groups in the compound (A-1) is an average of at least about one, preferably an average of about 2 to about 100, in one molecule. An average of less than one epoxy group in one molecule degrades the low temperature curability and is undesirable.

Appropriately the number of reactive silicon groups in the compound (A-1) is an average of at least about one, preferably an average of about 1 to about 300, in one molecule. An average of less than one reactive silicon group in one molecule degrades the low temperature curability and is undesirable.

It is suitable that the compound (A-1) have an average molecular weight of about 200 to about 100,000, preferably about 500 to about 50,000. An average molecular weight of less than about 200 tends to reduce the durability of the cured product, whereas an average molecular weight in excess of about 100,000 is apt to impair the storage stability of the composition and to degrade the appearance of the cured product. Hence an average molecular weight outside said range is undesirable.

Examples of the compound (A-1) which can be used in the present invention include conventional compounds which fulfil the above requirements. The compound (A-1) which is usable can be selected for use from, e.g. copolymers of ethylenically unsaturated monomers, polyester resins, silicone-modified polyester resins, epoxy-modified polyester resins, silicone-modified epoxy resins, fluorine-containing resins, etc.

Compounds known as silane coupling agents such as γ-glycidoxypropyl methoxysilane are also usable as the compound (A-1). But these compounds provide compositions with lower storage stability and curability and provide cured products with lower durability than the foregoing copolymers and resins.

Especially preferred as the compound (A-1) are copolymers of ethylenically unsaturated monomers, namely copolymers prepared by radical copolymerization reaction of the undermentioned epoxy group-containing ethylenically unsaturated monomer (a), reactive silicon group-containing ethylenically unsaturated monomer (b) and optional other ethylenically unsaturated monomer (c).

Examples of the epoxy group-containing ethylenically unsaturated monomer (a) are glycidyl (meth)acrylate, methylglycidyl (meth)acrylate, allylglycidyl ether, 3,4-epoxycyclohexylmethyl (meth)acrylate, etc.

Examples of the reactive silicon group-containing ethylenically unsaturated monomer (b) are vinyl trimethoxysilane, vinyl triethoxysilane, vinyl tris(2- methoxyethoxy)silane, γ-(meth)acryloyloxypropyl trimethoxysilane, γ-(meth)acryloyloxypropyl triethoxysilane, γ-(meth)acryloyloxypropyl methyldimethoxysilane, β-(meth)acryloyloxyethylpropyl trimethoxysilane and copolycondensates of these compounds with trifunctional silane compounds, tetrafunctional silane compounds, low condensates of tetrafunctional silane compounds or the like (these silane compounds being described later for the explanation of reactive silicon-containing resins), reaction products of hydroxyl group-containing ethylenically unsaturated monomer (d) to be described later with low condensates of tetrafunctional silane compounds, etc.

Examples of the other ethylenically unsaturated monomer (c) are methyl (meth)acrylate, ethyl (meth)acrylate, propyl (meth)acrylate, butyl (meth)acrylate, octyl (meth)acrylate, 2-ethylhexyl (meth)acrylate, stearyl (meth)acrylate, cyclohexyl (meth)acrylate and like alkyl (meth)acrylates of 1 to 24 carbon atoms or cycloalkyl (meth)acrylates thereof; perfluorobutylethyl (meth)acrylate, perfluorooctylethyl (meth)acrylate, perfluoroisononylethyl (meth)acrylate, perfluorodecylethyl (meth)acrylate and like perfluoroalkyl group- or perfluoroalkenyl group-containing ethylenically unsaturated monomers; styrene, vinyltoluene and like aromatic vinyl monomers; (meth)acrylonitrile and like nitrile monomers; and (meth)acrylamide, N-butoxymethyl (meth) acrylamide and like amide monomers.

Mixture (A-2) of epoxy group-containing compound and reactive silicon group-containing compound (i) Epoxy group-containing compound Conventional epoxy group-containing compounds can be used as the epoxy group-containing compound (i). Especially proper are compounds having an average of at least about one epoxy group, preferably an average of about 2 to about 100 epoxy groups, in one molecule and an average molecular weight of about 130 to about 100,000. An average of less than about one epoxy group in one molecule degrades the low temperature curability and is undesirable.

Examples of the epoxy group-containing compound (i) are (co)polymers of the foregoing epoxy group-containing ethylenically unsaturated monomer (a) and optional other ethylenically unsaturated monomer (c); bis(3,4-epoxycyclohexylmethyl)adipate, bis(3,4-epoxy-6-methylcyclohexylmethyl)adipate, 3,4-epoxy-6-methylcyclohexylmethyl-3,4-epoxy-6-methylcyclohexane carboxylate, ethylene glycol diester of 3,4-epoxycyclohexenecarboxylic acid, 3,4-epoxycyclohexylmethyl-3,4-epoxycyclohexane carboxylate and like alicyclic epoxy compounds; (poly)ethylene glycol diglycidyl ether, (poly)propylene glycol diglycidyl ether, trimethylolpropane triglycidyl ether, epoxidized polybutadiene, triglycidylisocyanurate and like aliphatic epoxy compounds; and bisphenol A type epoxy resins, bisphenol F type epoxy resins, bisphenol B type epoxy resins, hydrogenated bisphenol type epoxy resins, phenol novolak type epoxy resins and like resins.

Of the (co)polymers of the epoxy group-containing ethylenically unsaturated monomer (a) and the optional other ethylenically unsaturated monomer (c), those having an average molecular weight of about 8,000 to about 100,000 are appropriate.

(ii) Reactive silicon group-containing compound

Examples of the reactive silicon group-containing compound (ii) include conventional reactive silicon group-containing compounds among which proper compounds are those having an average of at least about one reactive silicon group, preferably an average of about 2 to about 300 reactive silicon groups, in one molecule and an average molecular weight of about 76 to about 200,000, preferably about 100 to about 50,000. An average of less than about one reactive silicon group in one molecule impairs the low temperature curability and is undesirable.

Among the reactive silicon group-containing compounds which can be used in the present invention, preferred are, for example, monofunctional silane compounds such as methoxytrimethylsilane, ethoxytriethylsilane, propoxytripropylsilane, butoxytributylsilane, methoxytrioctylsilane, methoxytriphenylsilane, methoxytribenzylsilane, triphenylhydroxysilane, etc.; difunctional silane compounds such as dimethoxydimethylsilane, dimethoxydiethylsilane, diethoxydibutylsilane, dipropoxydipropylsilane, dimethoxydilaurylsilane, dimethoxydiphenylsilane, dimethoxydibenzylsilane, methoxybenzyloxydipropylsilane, methoxy-2-ethylhexyloxydipropylsilane, diphenylsilanediol, etc.; trifunctional silane compounds such as trimethoxymethylsilane, triethoxyethylsilane, tripropoxypropylsilane, trimethoxystearylsilane, trimethoxyphenylsilane, trimethoxybenzylsilane, methoxydibenzyloxypropylsilane, methyltrihydroxysilane, phenyltrihydroxysilane, etc.; tetrafunctional silane compounds such as tetramethoxysilane, tetraethoxysilane, tetrapropoxysilane, etc.; low condensates of said tetrafuntional silane compounds; modified silicon condensates of low condensates of tetrafunctional silane compounds; and polymers prepared by radical polymerization of the reactive silicon group-containing ethylenically unsaturated monomer (b) and the optional other ethylenically unsaturated monomer (c).

Among said low condensates of tetrafunctional silane compounds, suitable are, for example, condensates formed from about 2 to about 100 molecules, preferably about 2 to about 10 molecules, of tetraalkoxysilane and prepared by the condensation of tetraalkoxysilanes with each other, the tetraalkoxysilane being represented by the formula $Si(OR^4)_4$ wherein $R^4$ is the same or different and represents a hydrogen atom, a methyl group, an ethyl group or a propyl group. Examples of said low condensates are, for example, "Colcoat ES40", (product of Colcoat Co., Ltd., trade name, the same hereinafter, a condensate of 1 to 10 molecules, an average of 5 molecules, of tetraethyl silicate), "Colcoat MS51" (a condensate of 1 to 10 molecules, an average of 4 molecules, of tetramethyl silicate), etc. These low condensates manufactured by Colcoat Co., Ltd. are presumably compounds having a structure represented by the formula

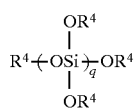

wherein $R^4$ is as defined above and q is an integer of 1 to 10.

The modified silicon condensates of low condensates of tetrafunctional silane compounds include, for example, condensates wherein the atom or group represented by $R^4$ and attached to a silicon atom is partly substituted by a monovalent hydrocarbon group of 4 to 24 carbon atoms, preferably 4 to 8 carbon atoms (which may contain an ether linkage and/or an ester linkage).

The monovalent hydrocarbon group of 4 to 24 carbon atoms in the modified silicon condensate includes, for example, a cyclic or straight-chain, optionally branched-chain alkyl group such as butyl, pentyl, hexyl, heptyl, octyl, decyl, stearyl, cycloalkyl and the like; an aryl group such as phenyl, toluyl, xylyl and the like; and an aralkyl group (alkyl group substituted by an aryl group) such as benzyl.

Examples of the hydrocarbon group containing an ether linkage are

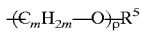

wherein m is 1, 2 or 3, p is 1 or 2 and $R^5$ is an alkyl group having 1 to 8 carbon atoms,

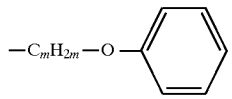

wherein m is as defined above, and so on. Specific examples include

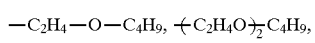

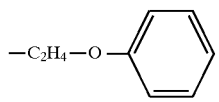

Examples of the hydrocarbon group containing an ester linkage are

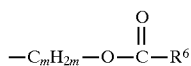

wherein $R^6$ is a cyclic or straight-chain, optionally branched-chain alkyl group having 1 to 8 carbon atoms, aryl group or an aralkyl group, and m is as defined above, etc. Specific examples include

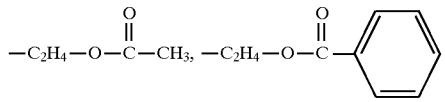

Examples of the hydrocarbon group containing both an ether linkage and an ester linkage include, for example,

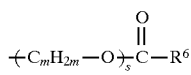

wherein s is an integer of at least 2, preferably an integer of 2 to 10, and m and $R^6$ are as defined above. Specific examples include

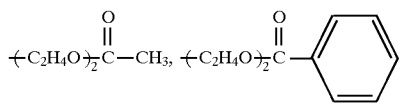

Said modified silicon condensate can be prepared, for example, by the condensation reaction of a monomer (substituted tetraalkoxysilane wherein the atom or group represented by $R^4$ in the tetraalkoxysilane is partly substituted by a monovalent hydrocarbon group having 4 to 24 carbon atoms) or by an alcohol-removing reaction of the low condensate of tetraalkoxysilane with an alcohol of 4 to 24 carbon atoms (which may contain an ether linkage and/or an ester linkage) to partly substitute the atom or group represented by $R^4$ of the low condensate with a hydrocarbon group having 4 to 24 carbon atoms.

When a polymer is used as the reactive silicon group-containing compound (ii), it is preferable to use a polymer having an average molecular weight of about 3,000 to about 200,000. An average molecular weight of less than about 3,000 tends to degrade the film properties such as acid resistance, whereas an average molecular weight of more than about 200,000 tends to reduce the solids content of the coating composition and to impair the finished appearance of the coating film. Hence an average molecular weight outside said range is undesirable.

The proportions of the epoxy group-containing compound (i) and the reactive silicon group-containing compound (ii) are about 0.1 to about 200 parts by weight, preferably about 1 to about 100 parts by weight, of the compound (ii) per 100 parts by weight of the compound (i).

Component (A) of thermosetting composition 2 Compound (A-3) containing (i) an epoxy group or groups, (ii) a reactive silicon group or groups and (iii) a hydroxyl group or groups and/or a carboxyl group or groups as essential functional group components in the same molecule Appropriately the number of epoxy groups in the compound (A-3) is an average of at least about one, preferably an average of about 2 to about 100, in one molecule. An average of less than about one epoxy group in one molecule degrades the low temperature curability and is undesirable.

Appropriately the number of reactive silicon groups in the compound (A-3) is an average of at least about one, preferably an average of about 1 to about 300, in one molecule. An average of about less than one reactive silicon group in one molecule deteriorates the low temperature curability and is undesirable.

The number of hydroxyl groups and/or carboxyl groups can be as follows. When a hydroxyl group or groups alone are present in one molecule, the hydroxyl value is about 10 to about 300, preferably about 20 to about 200. When a carboxyl group or groups alone are present in one molecule, the acid value is about 10 to about 300, preferably about 20 to about 200. When both of hydroxyl and carboxyl groups are present in one molecule, suitably the hydroxyl value is about 1 to 300, preferably about 2 to about 200, and the acid value is about 1 to about 300, preferably about 2 to about 200.

If the number of hydroxyl groups and/or carboxyl groups is below said range, the low temperature curability of the composition is degraded, whereas if it is above said range, the storage stability of the composition and the durability of the cured coating film are impaired. Hence the number of the groups outside said range is undesirable.

It is appropriate that the compound (A-3) have an average molecular weight of about 200 to about 100,000, preferably about 500 to about 50,000. An average molecular weight of less than about 200 impairs the durability of the cured product, whereas an average molecular weight in excess of about 100,000 degrades the storage stability of the composition and deteriorates the appearance of the cured product. Hence an average molecular weight outside said range is undesirable.

Examples of the compound (A-3) which can be used in the present invention include conventional compounds which fulfil the above requirements. The compound (A-3) which is usable can be suitably selected from polymers of ethylenically unsaturated monomers, polyester resins, silicone-modified polyester resins, epoxy-modified polyester resins, silicone-modified epoxy resins, fluorine-containing resins, etc. among which the undermentioned polymers of ethylenically unsaturated monomers are especially preferred.

The polymers of ethylenically unsaturated monomers to be used include, for example, copolymers prepared by radical copolymerization reaction of the epoxy group-containing ethylenically unsaturated monomer (a); the reactive silicon group-containing ethylenically unsaturated monomer (b); the hydroxyl group-containing ethylenically unsaturated monomer (d) and/or a carboxyl group-containing ethylenically unsaturated monomer (e); and the optional other ethylenically unsaturated monomer (c).

The same examples of monomers as given hereinbefore can be used as the epoxy group-containing ethylenically unsaturated monomer (a), the reactive silicon group-containing ethylenically unsaturated monomer (b), and the other ethylenically unsaturated monomer (c). Examples of the hydroxyl group-containing ethylenically unsaturated monomer (d) and the carboxyl group-containing ethylenically unsaturated monomer (e) are given below.

Examples of the hydroxyl group-containing ethylenically unsaturated monomer (d) are hydroxypropyl (meth)acrylate, hydroxybutyl (meth)acrylate, (poly)ethylene glycol mono (meth)acrylate, (poly)propylene glycol mono(meth)acrylate, addition products of these monomers with caprolactone ($\epsilon$-caprolactone, etc.), addition products of said hydroxyl group-containing ethylenically unsaturated monomer (d) with an acid anhydride (e.g., succinic anhydride, hexahydrophthalic anhydride, trimellitic anhydride, etc.) and so on.

Examples of the (anhydrous) carboxyl group-containing ethylenically unsaturated monomer (e) are (meth)acrylic acid, maleic acid (anhydride), etc.

Mixture (A-4) of at least two types of compounds, each compound containing at least one member selected from the class consisting of (i) epoxy group or groups, (ii) reactive silicon group or groups and (iii) hydroxyl group or groups and/or carboxyl group or groups, and all of the functional group components (i) to (iii) being present in the mixture.

The mixture (A-4) includes, for example, the following mixtures.

(I) A mixture of two types of compounds, i.e. an epoxy group-containing compound and a reactive silicon group-containing compound, hydroxyl group or groups and/or carboxyl group or groups being present in at least one of the epoxy group-containing compound and the reactive silicon group-containing compound.
(II) A mixture of three types of compounds, i.e. an epoxy group-containing compound, a reactive silicon group-containing compound, and a hydroxyl group- and/or carboxyl group-containing compound.
(III) A mixture of three types of compounds, i.e. an epoxy group-containing compound, a reactive silicon group-containing compound and a hydroxyl group- and/or carboxyl group-containing compound, hydroxyl group or groups and/or carboxyl group or groups being present in at least one of the epoxy group-containing compound and the reactive silicon group-containing compound.
(IV) A mixture of two types of compounds, i.e. an epoxy group- and reactive silicon group-containing compound and a hydroxyl group- and/or carboxyl group-containing compound.

The mixtures (I) to (IV) are described below in more detail.

(I) a mixture of two types of compounds, i.e. an epoxy group-containing compound and a reactive silicon group-containing compound, hydroxyl group or groups and/or carboxyl group or groups being present in at least one of the epoxy group-containing compound and the reactive silicon group-containing compound Proper examples of the mixture (I) are as follows.

(1) A mixture of an epoxy group- and hydroxyl group-containing compound and a reactive silicon group-containing compound.
(2) A mixture of an epoxy group-containing compound and a reactive silicon group- and hydroxyl group-containing compound.
(3) A mixture of an epoxy group- and hydroxyl group-containing compound and a reactive silicon group- and hydroxyl group-containing compound.
(4) A mixture of an epoxy group-containing compound and a reactive silicon group- and carboxyl group-containing compound.
(5) A mixture of an epoxy group-containing compound and a reactive silicon group-, hydroxyl group- and carboxyl group-containing compound.
(6) A mixture of an epoxy group- and hydroxyl group-containing compound and a reactive silicon group- and carboxyl group-containing compound.
(7) A mixture of an epoxy group- and hydroxyl group-containing compound and a reactive silicon group-, hydroxyl group- and carboxyl group-containing compound.

Suitable examples of the epoxy group-containing compound described above in (2), (4) and (5) are compounds containing an average of at least about one epoxy group, preferably an average of about 2 to about 100 epoxy groups, in one molecule and having an average molecular weight of about 130 to about 100,000, preferably about 200 to about 80,000.

The epoxy group-containing compound includes, for example, the same compounds as the epoxy group-containing compound (i) in the mixture (A-2) described above.

Among the epoxy group-containing compounds, polymers formed from the epoxy group-containing ethylenically unsaturated monomer (a) and the optional other ethylenically unsaturated monomer (c) preferably have an average molecular weight of about 5,000 to about 100,000.

Appropriate examples of the epoxy group- and hydroxyl group-containing compound described above in (1), (3), (6) and (7) are compounds containing an average of at least about one epoxy group, preferably an average of about 2 to about 100 epoxy groups, in one molecule and having a hydroxyl value of about 10 to about 300, preferably about 20 to about 200 and an average molecular weight of about 1,000 to about 100,000, preferably about 5,000 to about 80,000.

Desirable as the epoxy group- and hydroxyl group-containing compound are, for example, copolymers prepared by radical polymerization of the epoxy group-containing ethylenically unsaturated monomer (a), the hydroxyl group-containing ethylenically unsaturated monomer (d) and the optional other ethylenically unsaturated monomer (c).

The reactive silicon group-containing compound described in (1) includes, for example, the same compounds as the reactive silicon group-containing compound (ii) in the mixture (A-2).

Suitable examples of the reactive silicon group- and hydroxyl group-containing compound described above in (2) and (3) are those containing an average of at least about one reactive silicon group, preferably an average of about 1 to about 300 reactive silicon groups, in one molecule and having a hydroxyl value of about 10 to about 300, preferably about 20 to about 200 and an average molecular weight of about 1,000 to about 100,000, preferably about 5,000 to about 80,000.

Useful as the reactive silicon group- and hydroxyl group-containing compound are, for example, copolymers prepared by radical polymerization of the reactive silicon group-containing ethylenically unsaturated monomer (b), the hydroxyl group-containing ethylenically unsaturated monomer (d) and the optional other ethylenically unsaturated monomer (c).

Proper examples of the reactive silicon group- and carboxyl group-containing compound described above in (4) and (6) are those containing an average of at least about one reactive silicon group, preferably an average of about 1 to about 300 reactive silicon groups, in one molecule and having an acid value of about 10 to about 300, preferably about 20 to about 200 and an average molecular weight of about 1,000 to about 100,000, preferably about 5,000 to about 80,000.

The reactive silicon group- and carboxyl group-containing compound to be used includes, for example, copolymers prepared by radical polymerization of the reactive silicon group-containing ethylenically unsaturated monomer (b), the carboxyl group-containing ethylenically unsaturated monomer (e) and the optional other ethylenically unsaturated monomer (c).

Proper examples of the reactive silicon group-, hydroxyl group- and carboxyl group-containing compound described above in (5) and (7) are compounds containing an average of at least about one reactive silicon group, preferably an average of about 1 to about 300 reactive silicon groups, in one molecule and having a hydroxyl value and an acid value each of which is about 10 to about 300, preferably about 20 to about 200, and an average molecular weight of about 1,000 to about 100,000, preferably about 5,000 to about 80,000.

Preferred as the reactive silicon group-, hydroxyl group- and carboxyl group-containing compound are, for example, copolymers prepared by radical polymerization of the reactive silicon group-containing ethylenically unsaturated monomer (b), the hydroxyl group-containing ethylenically unsaturated monomer (d), the carboxyl group-containing ethylenically unsaturated monomer (e) and the optional other ethylenically unsaturated monomer (c).

Suitable proportions of the epoxy group-containing compound and the reactive silicon group-containing compound in the mixture (I) described above are about 5 to about 95% by weight, preferably about 20 to about 80% by weight, of the epoxy group-containing compound, and about 5 to about 95% by weight, preferably about 20 to about 80% by weight, of the reactive silicon group-containing compound, based on the combined amount of the epoxy group-containing compound and the reactive silicon group-containing compound. The proportions outside these ranges degrade the low temperature curability of the composition, and the acid resistance, scratch resistance and other properties of cured products and are therefore undesirable.

(II) A mixture of three types of compounds, i.e. an epoxy group-containing compound, a reactive silicon group-containing compound and a hydroxyl group- and/or carboxyl group-containing compound The epoxy group-containing compound includes, for example, the same compounds as the epoxy group-containing compound described in (2) for the mixture (I).

The reactive silicon group-containing compound includes, for example, the same compounds as the reactive silicon group-containing compound described in (1) for the mixture (I).

The number of hydroxyl groups and/or carboxyl groups in the hydroxyl group- and/or carboxyl group-containing compound can be as follows. When a hydroxyl group or groups alone are present in one molecule, the hydroxyl value is about 10 to about 300, preferably about 20 to about 200. When a carboxyl group or groups alone are present in one molecule, the acid value is about 10 to about 300, preferably about 20 to about 200. When both of hydroxyl and carboxyl groups are present in one molecule, suitably the hydroxyl value is about 1 to 300, preferably about 2 to about 200, and the acid value is about 1 to about 300, preferably about 2 to about 200.

It is appropriate to use a hydroxyl group- and/or carboxyl group-containing compound having an average molecular weight of about 1,000 to about 100,000, preferably about 5,000 to about 80,000.

The hydroxyl group-containing compound which can be used includes conventional compounds such as (co)polymers of ethylenically unsaturated monomers, polyester resins, alkyd resins, polyether resins, etc. Proper examples are (co)polymers prepared by radical polymerization of the hydroxyl group-containing ethylenically unsaturated monomer (d) and the optional other ethylenically unsaturated monomer (c).

The carboxyl group-containing compound which can be used includes conventional compounds such as (co)polymers of ethylenically unsaturated monomers, polyester resins, alkyd resins, etc. Among them, suitable are (co)polymers prepared by radical polymerization of the carboxyl group-containing ethylenically unsaturated monomer (e) and the optional other ethylenically unsaturated monomer (c).

Usable as the hydroxyl group- and carboxyl group-containing compound are conventional compounds such as copolymers of ethylenically unsaturated monomers, polyester resins, alkyd resins, etc. Among them, suitable are (co)polymers prepared by radical polymerization of the hydroxyl group-containing ethylenically unsaturated monomer (d), the carboxyl group-containing ethylenically unsaturated monomer (e) and the optional other ethylenically unsaturated monomer (c).

Proper proportions of the epoxy group-containing compound, the reactive silicon group-containing compound and the hydroxyl group- and/or carboxyl group-containing compound in the mixture (II) described above are about 5 to about 95% by weight, preferably about 20 to about 80% by weight, of the epoxy group-containing compound, about 5 to about 95% by weight, preferably about 20 to about 80% by weight, of the reactive silicon group-containing compound, and about 10 to about 70% by weight, preferably about 20 to about 60% by weight, of the hydroxyl group- and/or carboxyl group-containing compound, based on the combined amount of these three types of compounds. The proportions outside these ranges degrade the low temperature curability, acid resistance, scratch resistance, etc. and are therefore undesirable.

(III) A mixture of three types of compounds, i.e. an epoxy group-containing compound, a reactive silicon group-containing compound and a hydroxyl group- and/or carboxyl group-containing compound, hydroxyl group or groups and/or carboxyl group or groups being present in at least one of the epoxy group-containing compound and the reactive silicon group-containing compound The epoxy group-containing compound and the reactive silicon group-containing compound include, for example, the same compounds as the epoxy group-containing compound and the reactive silicon group-containing compound in the mixture (I).

The hydroxyl group- and/or carboxyl group-containing compound includes, for example, the same compounds as the hydroxyl group- and/or carboxyl group-containing compound in the mixture (II) described above.

The mixture (III) includes, for example, a mixture of an epoxy group-, hydroxyl group- and reactive silicon group-containing compound, a reactive silicon group-containing compound and a hydroxyl group- and carboxyl group-containing compound.

The epoxy group-, hydroxyl group- and reactive silicon group-containing compound to be used includes, for example, copolymers prepared by radical polymerization of the epoxy group-containing ethylenically unsaturated monomer (a), the hydroxyl group-containing ethylenically unsaturated monomer (d), the reactive silicon group-containing ethylenically unsaturated monomer (b) and the optional other ethylenically unsaturated monomer (c).

Suited proportions of the epoxy group-containing compound, the reactive silicon group-containing compound and the hydroxyl group- and/or carboxyl group-containing compound in the mixture (III) described above are about 5 to about 95% by weight, preferably about 20 to about 80% by weight, of the epoxy group-containing compound, about 5 to about 95% by weight, preferably about 20 to about 80% by weight, of the reactive silicon group-containing compound, about 10 to about 70% by weight, preferably about 20 to about 60% by weight, of the hydroxyl group- and/or carboxyl group-containing compound, based on the combined amount of these three types of compounds. The proportions outside these ranges degrade the low temperature curability, acid resistance, scratch resistance, etc. and are therefore undesirable.

(IV) A mixture of two types of compounds, i.e. an epoxy group- and reactive silicon group-containing compound and a hydroxyl group- and/or carboxyl group-containing compound.

Proper examples of the epoxy group- and reactive silicon group-containing compound are compounds containing an average of at least about one epoxy group, preferably an average of about 2 to about 100 epoxy groups, in one molecule and an average of at least about one reactive silicon group, preferably an average of about 1 to about 300 reactive silicon groups, in one molecule and having an average molecular weight of about 1,000 to about 100,000, preferably about 5,000 to about 80,000.

Usable as the epoxy group- and reactive silicon group-containing compound are, for example, copolymers prepared by radical copolymerization of the epoxy group-containing ethylenically unsaturated monomer (a), the reactive silicon group-containing ethylenically unsaturated monomer (b) and the optional other ethylenically unsaturated monomer (c).

The hydroxyl group- and/or carboxyl group-containing compound includes, for example, the same compounds as the hydroxyl group- and/or carboxyl group-containing compound in the mixture (II) described above.

Suitable proportions of the epoxy group- and reactive silicon group-containing compound, and a hydroxyl group- and/or carboxyl group-containing compound are about 30 to about 90% by weight, preferably about 40 to about 80% by weight, of the epoxy group- and reactive silicon group-containing compound and about 10 to about 70% by weight, preferably about 20 to about 60% by weight, of the hydroxyl group- and/or carboxyl group-containing compound, based on the combined amount of the two compounds. The proportions outside these ranges degrade the low temperature curability, acid resistance, scratch resistance, etc. and are therefore undesirable.

If the numbers of epoxy groups and reactive silicon groups in the mixture (A-4) are outside said ranges, the low temperature curability, acid resistance, scratch resistance and like properties are impaired. The numbers of these groups outside said ranges are therefore undesirable. An average molecular weight below said range deteriorates the durability of the coating film, whereas an average molecular weight above said range impairs the storage stability of the composition and the appearance of the coating film. Thus an average molecular weight outside said range is undesirable.

The radical polymerization reactions for producing the foregoing respective components can be conducted by conventional methods, e.g. by polymerization reaction of ethylenically unsaturated monomers at about 60 to about 200° C. for about 1 to about 10 hours in the presence of a polymerization initiator (such as azoisobutyronitrile, azobisdimethylvaleronitrile, di-tert-butylhydroperoxide, benzoyl peroxide or the like) in an organic solvent (such as ketone solvents, ester solvents, alcohol solvents, ether solvents or hydrocarbon solvents).

Organotin catalyst (B)

The organotin catalyst (B) which can be used in the present invention includes, for example, an organotin catalyst (B-1) which is a compound containing organic group attached to a divalent or tetravalent tin atom, said compound having a boiling point of not lower than 150° C. and retaining a liquid or solid form at room temperature (20° C.), and an organotin chelate catalyst (B-2) which contains organic chelating agent attached to a tetravalent tin atom, the number of the attached chelating agent being less than or equal to the valence of the atom. These catalysts can be used alone or in combination.

Organotin catalyst (B-1)

Examples of organic groups attached to a tin atom include a monovalent hydrocarbon group having 1 to 20 carbon atoms, a group containing an ether linkage and/or an ester linkage in the hydrocarbon group, etc. The organotin catalyst (B-1) includes compounds having at least two tin atoms in one molecule.

When the thermosetting composition of the present invention contains, among said type of the organotin catalyst (B-1), an organotin compound containing an ether linkage and/or an ester linkage as well as the hydrocarbon group as an organic group and represented by the following formula (I) or (II), the composition has the advantages of having further improved storage stability, low temperature curability and resistance to yellowing:

$$(R^7)_n Sn(OR^8)_{4-n} \qquad (I)$$

$$(R^7)_u Sn(OR^8)_{2-u} \qquad (II)$$

wherein $R^7$ is the same or different and represents a monovalent hydrocarbon group having 1 to 20 carbon atoms, $R^8$ is the same or different and represents a monovalent hydrocarbon group having 1 to 20 carbon atoms, a group —COCH=CHCOOR$^7$ or

n is an integer of 0 or 1 to 3 and u is an integer of 0 or 1.

The organotin catalysts can be used either alone or in combination.

The monovalent hydrocarbon group of 1 to 20 carbon atoms in the above-mentioned organic group and in the organotin catalyst (B-1) represented by the formula (I) or (II) can be any of aliphatic hydrocarbon group, alicyclic hydrocarbon group, aromatic hydrocarbon group and a combination of these groups. The aliphatic hydrocarbon group may be of the straight-chain or branched-chain type or may be a group having an unsaturated bond, such as methyl, ethyl, n-propyl, iso-propyl, n-butyl, iso-butyl, tert-butyl, n-pentyl, iso-pentyl, tert-pentyl, neo-pentyl, n-hexyl, n-heptyl, n-octyl, n-nonyl, n-decyl, dodecyl, tridecyl, tetradecyl, etc.

Representative of the alicyclic hydrocarbon group are a cyclohexyl group and the like. Typical of the aromatic hydrocarbon group are phenyl, methylphenyl, dimethylphenyl, toluyl, xylyl and the like. Illustrative of the combination of aliphatic hydrocarbon group and aromatic hydrocarbon group are benzyl, phenethyl and the like. Among these hydrocarbon groups, an alkyl group having 1 to 20 carbon atoms and a phenyl group are preferred.

The organotin catalyst (B-1) represented by the formula (I) or (II) wherein $R^8$ is

and having an ester linkage is excellent in storage stability, low temperature curability, and other properties. Preferred catalysts of the formula (I) or (II) are those wherein $R^7$ is an alkyl group of 1 to 20 carbon atoms or a phenyl group.

The organotin catalyst (B-1) of the formula (I) wherein n is 0 or 1 is excellent in storage stability, low temperature curability and other properties.

Examples of the organotin catalyst (B-1) of the formula (I) having an ester linkage are tin tetraacetate, tin tetraoctate, tin tetralaurate, butyltin triacetate, butyltin tributyrate, butyltin trihexylate, butyltin trioctate, butyltin trilaurate, butyltin trimethylmalate, octyltin triacetate, octyltin tributyrate, octyltin trihexylate, octyltin trioctate, octyltin trilaurate, octyltin trimethylmalate, phenyltin tributyrate, phenyltin trilaurate, dibutyltin diacetate, dibutyltin dibutyrate, dibutyltin dihexylate, dibutyltin dioctate, dibutyltin dilaurate, dibutyltin diethylmalate, dioctyltin diacetate, dioctyltin dibutyrate, dioctyltin dihexylate, dioctyltin dioctate, dioctyltin dilaurate, dioctyltin diethylmalate, tributyltin acetate, tributyltin butyrate, tributyltin hexylate, tributyltin octate, tributyltin laurate, tributyltin methylmalate, trioctyltin acetate, trioctyltin butyrate, trioctyltin hexylate, trioctyltin octate, trioctyltin laurate, trioctyltin methylmalate, etc. Examples of the organotin catalyst (B-1) of the formula (I) having an ether linkage are butyltin trimethoxy, butyltin tributoxy, octyltin trimethoxy, phenyltin trimethoxy, dibutyltin dimethoxy, dioctyltin dimethoxy, dioctyltin dibutoxy, tributyltin butoxy, etc.

Of the foregoing examples, preferred are tin tetraacetate, butyltin triacetate, butyltin tributyrate, butyltin trioctate, butyltin trilaurate, octyltin triacetate, octyltin tributyrate, etc.

Examples of the organotin catalyst (B-1) of the formula (II) are tin diacetate, tin dibutyrate, tin dioctate, tin dilaurate, etc.

Organotin chelate catalyst (B-2)

The organotin chelate catalyst (B-2) is a compound which contains organic chelating agent attached to a tetravalent tin atom, the number of the attached chelating agent being less than or equal to the valence of the atom.

Examples of the organic chelating agent can be conventional compounds and include compounds having at least one member selected from the group consisting of oxygen atom, sulfur atom and nitrogen atom. Among them, preferred are compounds containing oxygen atoms and more preferred are compounds which can constitute a keto-enol tautomer.

Examples of the compounds which can constitute a keto-enol tautomer are β-diketones (acetylacetone, etc.), acetoacetic esters (methyl acetoacetate, etc.), malonic esters (ethyl malonate, etc.), ketones having a hydroxyl group in the β-position (diacetone alcohol, etc.), aldehydes having a hydroxyl group in the β-position (salicylaldehyde, etc.), esters having a hydroxyl group in the β-position (methyl salicylate, etc.) and so on. In particular, the use of acetoacetic ester or β-diketone gives a good result.

The organotin chelate catalyst (B-2) can be prepared by mixing an organic chelating agent with a tetravalent tin compound in proportions of about 1 to about 10 moles of the former per mole of the latter and heating the mixture, when so required.

Examples of said tin compound are organic acid salt, alkoxide, hydroxide, halide, sulfide and mixtures thereof. The organic acid salt and the alkoxide to be used as the tin compound include the organotin compound of the formula (I).

Illustrative of the halide to be used as the tin compound are stannic chloride compounds and the like. Representative of the sulfide are compounds represented by the formula (III)

$$(R^7)_n Sn(SR^9)_{4-n} \qquad (III)$$

wherein $R^9$ is the same or different and represents a monovalent hydrocarbon group of 1 to 20 carbon atoms or a group $-C_vH_{2v}COOR^7$ in which v is an integer of 1 to 4, and $R^7$ and n are as defined above. The monovalent hydrocarbon group of 1 to 20 carbon atoms represented by $R^9$ includes the foregoing examples.

Specific examples of the sulfide are $C_4H_9Sn(SCH_2COOC_8H_{17})_3$, $(C_4H_9)_2Sn(SCH_2COOC_8H_{17})_2$, $C_8H_{17}Sn(SCH_2COOC_8H_{17})_3$, $(C_8H_{17})_2Sn(SCH_2COOC_8H_{17})_2$, $(C_4H_9)_2Sn(SC_4H_9)_2$, $C_4H_9Sn(SC_4H_9)_3$, etc.

Examples of the organotin chelate catalyst (B-2) include a compound having 2 moles of organic chelating agent attached to a tetravalent tin atom such as a compound represented by the formula

wherein A is the same or different and represents $R^7$, $OR^8$ or $SR^9$,

represents a chelate ring structure formed by the organic chelating agent, and $R^7$, $R^8$ and $R^9$ are as defined above.

Preferred examples of the organotin chelate catalyst (B-2) are monobutylbis(ethylacetoacetate)tin acetate, monobutylbis(acetylacetonato)tin octate, monobutylbis (ethylacetoacetate)tin laurate, bis(propylacetoacetate)tin diacetate bis(propylacetoacetate)tin dilaurate, bis (acetylacetonato)tin diacetate, bis(acetylacetonato)tin dioctate, bis(acetylacetonato)tin dilaurate, bis (ethyacetoacetate)tin dioctate bis(ethylacetoacetate)tin diacetate, bis(ethylacetoacetate)tin dilauratee, bis (propylacetoacetate)tin dioctate, etc.

A proper proportion of the organotin catalyst (B) in the thermosetting composition 1 of the present invention is about 0.001 to about 20 parts by weight, preferably about 0.01 to about 15 parts by weight, per 100 parts by weight of the component (A), namely the compound (A-1) or the mixture (A-2).

An appropriate proportion of the organotin catalyst (B) in the thermosetting composition 2 of the present invention is about 0.001 to about 20 parts by weight, preferably about 0.01 to about 15 parts by weight, per 100 parts by weight of the component (A), namely the compound (A-3) or the mixture (A-4).

If the proportion of the organotin catalyst (B) is less than said range in any of the thermosetting compositions 1 and 2 according to the invention, the low temperature curability is degraded, whereas if it is above said range, the low temperature curability is not enhanced and the finished appearance and the durability of the cured product are impaired. Hence the proportion of the catalyst (B) outside said range is undesirable.

When required, the thermosetting compositions 1 and 2 according to the invention may contain additives such as coloring agents, fillers, organic solvents, UV stabilizers, UV absorbers, rheology control agents and the like in addition to the component (A) and the organotin catalyst (B) described above.

The thermosetting compositions 1 and 2 according to the invention can cure at a temperature of about 60° C. or higher. The applications of compositions 1 and 2 are not specifically limited and can be selected from a broad range in technical fields. Preferably the compositions are used in the coating area.

The curing methods using the thermosetting compositions of the present invention are described below.

The curing method using the thermosetting composition 1 or 2 of the present invention comprises the steps of coating a substrate with a solution or dispersion of the thermosetting composition 1 or 2 in an organic solvent and heating the coated substrate for curing. A preferred solids concentration is about 20 to about 99% by weight.

Organic solvents for use in dissolving or dispersing the thermosetting composition 1 or 2 are not critical insofar as they are capable of dissolving or dispersing the components (A) and (B) of each composition. Useful organic solvents can be suitably selected from conventional organic solvents. The organic solvent for use can be properly selected depending on the type of the thermosetting composition used and includes, for example, ester solvents, ketone solvents, ether solvents, alcohol solvents and hydrocarbon solvents.

There is no specific restriction on substrates to be coated with the thermosetting composition insofar as they become neither dissolved in organic solvents nor fused or changed in the properties when heated to about 60° C. Useful substrates can be selected from a broad range of conventional ones, and include, for example, treated or untreated metals, plastics, papers, fibers and these substrates coated, etc.

The method of coating a substrate includes conventional coating means such as spray coating, brushing, roller coating, dipping, etc. The composition is applied to a film thickness of about 1 to about 100 gm when dried.

Heating for curing can be suitably accomplished at a temperature of about 60° C. or higher, preferably about 100 to about 300° C. The heating time is widely varied depending on the temperature and is, for example, about 10 seconds at about 250° C. or about 3 hours at about 60° C.

The method of forming a finish coat according to the present invention is described below.

The method of forming a finish coat according to the present invention comprises the steps of forming a colored base coat on a substrate and forming a clear topcoat. In this method, one or both of a colored base coat and a clear topcoat are formed using a curable coating composition prepared by dissolving or dispersing the thermosetting composition 1 or 2 in an organic solvent.

Stated more specifically, the method of forming a finish coat according to the invention comprises the steps of forming a colored base coat on a substrate and forming a clear topcoat, the method being characterized in that the colored base coat and/or the clear topcoat is formed from a curable coating composition comprising, as the essential components, (A) a compound (A-1) containing an epoxy group or groups and a reactive silicon group or groups as essential functional group components in the same molecule, or a mixture (A-2) of an epoxy group-containing compound and a reactive silicon group-containing compound, (B) an organotin catalyst, and (C) an organic solvent, or a curable coating composition comprising, as the essential components, (A) a compound (A-3) containing (i) an epoxy group or groups, (ii) a reactive silicon group or groups and (iii) a hydroxyl group or groups and/or a carboxyl group or groups as essential functional group components in the same molecule, or a mixture (A-4) of at least two types of compounds, each compound containing at least one member selected from the class consisting of the functional group components (i) to (iii), and all of the functional group components (i) to (iii) being present in the mixture, (B) an organotin catalyst, and (C) an organic solvent.

The method of the present invention is suited as a method of forming a finish coat on automobiles, household electrical appliances, building materials, etc.

The curable coating composition which is used in the method of forming a finish coat using the thermosetting composition 1 or 2 according to the invention is prepared by adding to an organic solvent the thermosetting composition 1 or 2 in an amount sufficient to achieve a solids content of about 10 to about 99% by weight.

Useful organic solvents are not specifically limited insofar as they are capable of dissolving or dispersing the component (A) and the component (B) in each composition. Such organic solvents can be used as suitably selected from conventional organic solvents and can be suitably chosen depending on the type of the thermosetting composition. Specific examples of such solvents are toluene, xylene and like aromatic hydrocarbon solvents, acetone, methyl ethyl ketone, methyl isobutyl ketone and like ketone solvents, ethyl acetate, propyl acetate, butyl acetate and like ester solvents, ethylene glycol monobutyl ether and like alcohol solvents, and so on.

When required, the curable coating composition for use in the invention may contain additives for coating compositions, such as extender pigments, UV absorbers, UV stabilizers, rheology control agents, etc. in addition to the components (A) and (B) described above.

The foregoing curable coating composition for use in the present invention can be used as a colored base coat composition by incorporating a coloring pigment in addition to the foregoing components (A) and (B).

Examples of useful coloring pigments are organic pigments such as quinacridone red and like quinacridone pigments, pigment red and like azo pigments, phthalocyanine blue, phthalocyanine green and like phthalocyanine pigments; inorganic powder pigments such as titanium oxide, carbon black and the like; and inorganic flake pigments such as aluminum flake, nickel flake, copper flake, brass flake, chromium flake, pearl mica, colored pearl mica and the like.

The foregoing curable coating composition for use in the present invention can be used by itself as a clear topcoat composition. The above-mentioned coloring pigment can be added to the clear topcoat composition such that the underlying colored base coat is not completely hidden.

Preferably the thermosetting compositions 1 and 2 are used for forming a clear topcoat, since the compositions are capable of producing a coating film excellent in acid resistance, scratch resistance, etc. Said compositions are also superior in low temperature curability.

Examples of substrates for forming a colored base coat in the method of forming a finish coat according to the present invention are substrates of metals, particularly steel plates (those treated for chemical conversion, those treated for chemical conversion and electrodeposited with a primer, those treated for chemical conversion, electrodeposited with a primer and intercoated, etc.), plastics (optionally, surface-treated plastics, surface-treated and primed plastics, surface-treated, primed and intercoated plastics, etc.) or combinations thereof.

The method of forming a finish coat according to the invention includes, for example, conventional coating methods known in the automotive industry, household electrical appliance industry, building material industry, etc., such as 2-coat 1-bake or 2-coat 2-bake coating method for colored base coat/clear topcoat, and 3-coat 1-bake or 3-coat 2-bake coating method for colored base coat/clear topcoat/clear topcoat.

Among these coating methods, a 2-coat 1-bake coating method is preferred. Typical examples of the 2-coat 1-bake coating method using the foregoing curable coating composition for a clear topcoat are described below.

First, a colored base coat composition is applied to the substrate usually by spray coating.

Useful colored base coat compositions are, for example, the foregoing curable coating composition containing a coloring pigment or conventional colored base coat compositions for automotive use.

Examples of said conventional colored base coat compositions are coating compositions comprising a coloring pigment and a curable composition such as an acrylic resin/amino resin composition, alkyd resin/amino resin composition, polyester resin/amino resin composition, acrylic resin/polyisocyanate composition, alkyd resin/polyisocyante composition, polyester resin/polyisocyanate composition, etc. Preferred amino resins are melamine resins.

The form of said conventional colored base coat composition is not specifically limited, and can be any of, e.g. organic solvent solution, non-aqueous dispersion, aqueous solution, aqueous dispersion, high solid mixture and the like.

Coaters to be used in spraying coating include, for example, air spray gun, airless spray gun, air spray electrostatic coaters, airless spray electrostatic coaters, rotatable atomizing electrostatic coaters, etc.

A preferred film thickness of the colored base coat composition is about 10 to about 30 $\mu$m when cured.

After application, the colored base coat is left to stand at room temperature for several minutes or forcedly dried at a temperature of about 50° to about 80° C. for several minutes, followed by application of the foregoing curable coating composition as a clear topcoat composition.

The coating method and the coater employed in using the clear topcoat composition may be the same as in using the colored base coat composition.

A preferred film thickness of the clear topcoat composition is about 20 to about 80 $\mu$m when cured.

Then the colored base coat and the clear topcoat are both heated for curing at the same time. The heating conditions are usually about 10 minutes to about 2 hours at about 100° to about 180° C.

In the method of forming a finish coat according to the present invention, the foregoing specific curable coating composition used as a composition for forming a finish coat can produce a coating film excellent particularly in low temperature curability, finished appearance, acid resistance, scratch resistance, weatherability, etc.

EXAMPLES

The present invention is described below in more detail with reference to Preparation Examples, Examples and Comparative Examples.

Preparation Example 1 Preparation of epoxy group- and reactive silicon group-containing compound (i)

Using a reactor equipped with a reflux condenser and a stirrer, a mixture of 150 g of methacryloxypropyl trimethoxysilane, 220 g of 3,4-epoxycyclohexylmethyl methacrylate, 500 g of cyclohexylmethyl acrylate, 130 g of butyl methacrylate and 10 g of azoisobutyronitrile was added dropwise to 1,000 g of xylene at 110° C. to undergo a reaction for 5 hours, giving an acrylic resin having a number average molecular weight of 10,000 (containing about 11 epoxy groups and about 19 alkoxysilyl groups in one molecule).

Preparation Example 2 Preparation of epoxy group- and reactive silicon group-containing compound (ii)

Using a reactor equipped with a reflux condenser and a stirrer, a mixture of 24 g of methacryloxypropyl trimethoxysilane, 40 g of 3,4-epoxycyclohexylmethyl methacrylate, 500 g of cyclohexylmethyl acrylate, 436 g of butyl methacrylate and 10 g of azoisobutyronitrile was added dropwise to 1,000 g of xylene at 110° C. to undergo a reaction for 5 hours, giving an acrylic resin having a number average molecular weight of 10,000 (containing about 2 epoxy groups and about 3 alkoxysilyl groups in one molecule).

Preparation Example 3 Preparation of epoxy group- and reactive silicon group-containing compound (iii)

Using a reactor equipped with a reflux condenser and a stirrer, a mixture of 150 g of methacryloxypropyl trimethoxysilane, 159 g of glycidyl methacrylate, 500 g of cyclohexylmethyl acrylate, 191 g of butyl methacrylate and 10 g of azoisobutyronitrile was added dropwise to 1,000 g of xylene at 110° C. to undergo a reaction for 5 hours, giving an acrylic resin having a number average molecular weight of 10,000 (containing about 11 epoxy groups and about 19 alkoxysilyl groups in one molecule).

Example 1

The compositions of the present invention and comparative compositions with a make-up shown below in Table 1 were prepared using the epoxy group- and reactive silicon group-containing compounds prepared in Preparation Examples 1 to 3.

The storage stability of the curable compositions as the products of the present invention and as the comparative products was evaluated by the following test method.

Storage stability: It was evaluated according to the following criteria.

A: The composition did not thicken at 40° C. in longer than 14 days.

B: The composition slightly thickened at 40° C. in 14 days.

C: The composition thickened and gelled at 40° C. in 1–13 days.

D: The composition gelled at 20° C. in 1 hour.

Subsequently, the curable compositions as the products of the present invention and as the comparative products were applied to a degreased mild steel plate to give a coating film having a dry thickness of about 50 μm, and were heated for curing at 120° C. for 30 minutes. Some properties of the obtained cured products were assessed by the following test methods.

Appearance: The cured film was observed to see if any undesirable change such as cracking, delustering or the like occurred. The film was rated as good when such change did not occur.

Curability: The cured film was separated from the substrate and extracted with an acetone solvent at a reflux temperature for 2 hours and the ratio (%) of remaining coating film was determined.

Resistance to yellowing: The coating film was visually inspected for yellowing before and after exposure to heat and rated according to the following criteria. A; no change. B; Yellowed to undesirable extent.

The results of the tests are shown also in Table 1.

TABLE 1

| Make-up (g) | | Product of the invention | | | | | | |
|---|---|---|---|---|---|---|---|---|
| | | 1 | 2 | 3 | 4 | 5 | 6 | 7 |
| Epoxy group- and reactive silicon group-containing compound | Type | i | i | i | i | i | ii | iii |
| | Amount | 200 | 200 | 200 | 200 | 200 | 200 | 200 |
| Catalyst | | | | | | | | |
| Butyltin triacetate | | 1.5 | 3.0 | | | | 1.5 | 1.5 |
| Butyltin trioctate | | | | 1.5 | | | | |
| Butyltin trilaurate | | | | | 1.5 | | | |
| Dibutyltin diacetate | | | | | | 1.5 | | |
| Boron trifluoroetherate | | | | | | | | |
| Tris (acetylacetonato) aluminum | | | | | | | | |
| Storage stability | | A | A | A | A | B | A | A |
| Properties | | | | | | | | |
| Appearance | | Good | Good | Good | Good | Good | Good | Good |
| Curability | | 91 | 95 | 90 | 88 | 82 | 90 | 70 |
| Resistance to yellowing | | A | A | A | A | A | A | A |

| Make-up (g) | | Product of the Invention | | | | |
|---|---|---|---|---|---|---|
| | | 8 | 9 | 10 | 11 | 12 |
| Epoxy group- and reactive silicon-group containing compound | Type | i | i | i | i | i |
| | Amount | 200 | 200 | 200 | 200 | 200 |
| Catalyst | | | | | | |
| Butylbis (ethylacetoacetate) tin acetate | | 1.0 | 2.0 | | | |
| Bis (ethylacetoacetate) tin diacetate | | | | 2.0 | | |
| Butylbis (acetylacetonato) tin octate | | | | | 2.0 | |
| Bis (acetylacetonato) tin dioctate | | | | | | 2.0 |
| Boron trifluoroetherate | | | | | | |
| Butyltin triacetate | | | | | | |
| Tris (acetylacetonato) aluminum | | | | | | |
| Storage stability | | A | A | A | A | A |
| Properties | | | | | | |
| Appearance | | Good | Good | Good | Good | Good |
| Curability | | 88 | 93 | 92 | 90 | 90 |
| Resistance to yellowing | | A | A | A | A | A |

| Make-up (g) | | Product of the Invention | | Comparative product | |
|---|---|---|---|---|---|
| | | 13 | 14 | 1 | 2 |
| Epoxy group- and reactive silicon-group containing compound | Type | ii | iii | i | i |
| | Amount | 200 | 200 | 200 | 200 |
| Catalyst | | | | | |
| Butylbis (ethylacetoacetate) tin acetate | | 2.0 | 2.0 | | |
| Bis (ethylacetoacetate) tin diacetate | | | | | |
| Butylbis (acetylacetonato) tin octate | | | | | |
| Bis (acetylacetonato) tin dioctate | | | | | |
| Boron trifluoroetherate | | | | 1.0 | |
| Butyltin triacetate | | | | | |
| Tris (acetylacetonato) aluminum | | | | | 1.0 |
| Storage stability | | A | A | D | C |

TABLE 1-continued

| Properties | | | | |
|---|---|---|---|---|
| Appearance | Good | Good | — | Good |
| Curability | 90 | 88 | — | 93 |
| Resistance to yellowing | A | A | — | B |

Preparation Example 4 Preparation of epoxy group-containing compound (i)

Using a reactor equipped with a reflux condenser and a stirrer, a mixture of 400 g of 3,4-epoxycyclohexylmethyl methacrylate, 600 g of butyl methacrylate and 10 g of azoisobutyronitrile was added dropwise to 1,000 g of xylene at 110° C. to undergo a reaction for 5 hours, giving an acrylic resin having a number average molecular weight of 10,000 (containing about 20 epoxy groups in one molecule).

Preparation Example 5 Preparation of epoxy group-containing compound (ii)

Using a reactor equipped with a reflux condenser and a stirrer, a mixture of 284 g of glycidyl methacrylate, 716 g of butyl methacrylate and 10 g of azoisobutyronitrile was added dropwise to 1,000 g of xylene at 110° C. to undergo a reaction for 5 hours, giving an acrylic resin having a number average molecular weight of 10,000 (containing about 20 epoxy groups in one molecule).

Preparation Example 6 Preparation of reactive silicon group-containing compound (a)

A mixture of 775 g of "Colcoat ES40", (product of Colcoat Co., Ltd., a condensate of an average of about 5 molecules of tetraethyl silicate and having an average of about 12 ethoxy groups in one molecule), 225 g of benzyl alcohol and 0.05 g of tris(acetylacetonato)alumi-num was subjected to a reaction for removing 96 g of ethanol at 160° C. for 3 hours, giving the objective compound. The obtained compound contained an average of about 10 ethoxy groups and two benzyl ether groups in one molecule.

Preparation Example 7 Preparation of reactive silicon group-containing compound (b)

Using a reactor equipped with a reflux condenser and a stirrer, a mixture of 243 g of methacryloxypropyl trimethoxysilane, 757 g of butyl methacrylate and 10 g of azoisobutyronitrile was added dropwise to 1,000 g of xylene at 110° C. to undergo a reaction for 5 hours, giving an acrylic resin having a number average molecular weight of 10,000 (containing about 30 methoxy groups in one molecule).

Example 2

The compositions of the present invention and comparative compositions with a make-up shown below in Table 2 were prepared using the compounds prepared in Preparation Examples 4 to 7 and an epoxy group-containing compound, i.e. "ERL-4221" (product of Union Carbide Corp., trade name, alicyclic diepoxy compound) (hereinafter referred to as "epoxy group-containing compound (iii)").

The storage stability, appearance, curability and resistance to yellowing of the curable compositions as the products of the present invention and as the comparative products were evaluated in the same manner as in Example 1. The test results are shown below in Table 2.

TABLE 2

| Make-up (g) | | Product of the Invention | | | | | | | | | |
|---|---|---|---|---|---|---|---|---|---|---|---|
| | | 1 | 2 | 3 | 4 | 5 | 6 | 7 | 8 | 9 | 10 |
| Epoxy group-containing compound | Type | iii | iii | iii | iii | iii | iii | iii | iii | iii | iii |
| | Amount | 200 | 200 | 200 | 200 | 200 | 200 | 200 | 200 | 200 | 200 |
| Reactive silicon group-containing compound | Type | a | a | a | a | a | b | c | d | a | a |
| | Amount | 30 | 30 | 30 | 30 | 30 | 30 | 30 | 30 | 30 | 30 |
| Catalyst | | | | | | | | | | | |
| Butyltin triacetate | | 1.5 | 3.0 | | | | | 1.5 | 1.5 | 1.5 | 1.5 |
| Butyltin trioctate | | | | 1.5 | | | | | | | |
| Butyltin trilaurate | | | | | 1.5 | | | | | | |
| Dibutyltin diacetate | | | | | | 1.5 | | | | | |
| Boron trilfluoroetherate | | | | | | | | | | | |
| Tris (acetylacetonato) aluminium | | | | | | | | | | | |
| Storage stability | | A | A | A | A | B | A | A | A | A | A |
| Properties | | | | | | | | | | | |
| Appearance | | Good | Good | Good | Good | Good | Good | Good | Good | Good | Good |
| Curability | | 92 | 95 | 91 | 88 | 80 | 92 | 92 | 92 | 94 | 70 |
| Resistance to yellowing | | A | A | A | A | A | A | A | A | A | A |

| Make-up (g) | | Product of the Invention | | | | | | | | | | Comparative product | |
|---|---|---|---|---|---|---|---|---|---|---|---|---|---|
| | | 11 | 12 | 13 | 14 | 15 | 16 | 17 | 18 | 19 | 20 | 1 | 2 |
| Epoxy group-containing compound | Type | iii | iii | iii | iii | iii | iii | iii | iii | i | ii | i | i |
| | Amount | 200 | 200 | 200 | 200 | 200 | 200 | 200 | 200 | 200 | 200 | 200 | 200 |
| Reactive silicon group-containing compound | Type | a | a | a | a | a | b | c | d | a | a | a | a |
| | Amount | 30 | 30 | 30 | 30 | 30 | 30 | 30 | 30 | 30 | 30 | 30 | 30 |

TABLE 2-continued

| Catalyst | | | | | | | | | | | | |
|---|---|---|---|---|---|---|---|---|---|---|---|---|
| Butylbis (ethylacetoacetate) tin acetate | 1.0 | 2.0 | | | 2.0 | 2.0 | 2.0 | 2.0 | 2.0 | | | |
| Bis (ethylacetoacetate) tin diacetate | | | 2.0 | | | | | | | | | |
| Butylbis (acetylacetonato) tin octate | | | | 2.0 | | | | | | | | |
| Bis (acetylacetonato) tin dioctate | | | | | 2.0 | | | | | | | |
| Boron trilfluoroetherate | | | | | | | | | | | 1.0 | |
| Butyltin triacetate | | | | | | | | | | | | |
| Tris (acetylacetonato) aluminum | | | | | | | | | | | | 1.0 |
| Storage stability | A | A | A | A | A | A | A | A | A | A | D | C |
| Properties | | | | | | | | | | | | |
| Appearance | Good | Good | Good | Good | Good | Good | Good | Good | Good | Good | — | Good |
| Curability | 90 | 94 | 92 | 91 | 91 | 93 | 92 | 91 | 94 | 89 | — | 93 |
| Resistance to yellowing | A | A | A | A | A | A | A | A | A | A | — | B |

Preparation Example 8 Preparation of acrylic resin (1)

Using a reactor equipped with a reflux condenser and a stirrer, a mixture of 150 g of methacryloxypropyl trimethoxysilane, 220 g of 3,4-epoxycyclohexylmethyl methacrylate, 232 g of hydroxyethyl acrylate, 200 g of cyclohexylmethyl acrylate, 198 g of butyl methacrylate and 10 g of azoisobutyronitrile was added dropwise to 1,000 g of xylene at 110° C. to undergo a reaction for 5 hours, giving an acrylic resin having a number average molecular weight of 10,000 (containing about 11 epoxy groups and about 19 alkoxysilyl groups in one molecule, and having a hydroxyl value of 112).

Preparation Example 9 Preparation of acrylic resin (2)

Using a reactor equipped with a reflux condenser and a stirrer, a mixture of 150 g of methacryloxypropyl trimethoxysilane, 220 g of 3,4-epoxycyclohexylmethyl methacrylate, 263 g of hydroxyethyl acrylate, 170 g of cyclohexylmethyl acrylate, 169 g of butyl methacrylate and 10 g of azoisobutyronitrile was added dropwise to 1,000 g of xylene at 110° C. to undergo a reaction for 5 hours. Then, 28 g of succinic anhydride was added at 80° C. to undergo a reaction for 2 hours, giving an acrylic resin having a number average molecular weight of 10,000 (containing about 11 epoxy groups and about 19 alkoxysilyl groups in one molecule, and having a hydroxyl value of 112 and an acid value of 15.6).

Preparation Example 10 Preparation of epoxy group-containing resin (3)

The procedure of Preparation Example 4 was repeated, giving an acrylic resin having a number average molecular weight of 10,000 (containing about 20 epoxy groups in one molecule).

Preparation Example 11 Preparation of epoxy group-containing resin (4)

Using a reactor equipped with a reflux condenser and a stirrer, a mixture of 284 g of glycidyl methacrylate, 358 g of butyl methacrylate, 358 g of cyclohexylmethyl acrylate and 10 g of azoisobutyronitrile was added dropwise to 1,000 g of xylene at 110° C. to undergo a reaction for 5 hours, giving an acrylic resin having a number average molecular weight of 10,000 (containing about 20 epoxy groups in one molecule).

Preparation Example 12 Preparation of acrylic resin (5)

Using a reactor equipped with a reflux condenser and a stirrer, a mixture of 232 g of hydroxyethyl acrylate, 384 g of cyclohexylmethyl acrylate, 384 g of butyl methacrylate and 10 g of azoisobutyronitrile was added dropwise to 1,000 g of xylene at 110° C. to undergo a reaction for 5 hours, giving an acrylic resin having a number average molecular weight of 10,000 (having a hydroxyl value of 112).

Preparation Example 13 Preparation of acrylic resin (6)

Using a reactor equipped with a reflux condenser and a stirrer, a mixture of 232 g of hydroxyethyl acrylate, 384 g of cyclohexylmethyl acrylate, 384 g of butyl methacrylate and 10 g of azoisobutyronitrile was added dropwise to 1,000 g of xylene at 110° C. to undergo a reaction for 5 hours. Then, 28 g of succinic anhydride was added at 80° C. to undergo a reaction for 2 hours, giving an acrylic resin having a number average molecular weight of 10,000 (having a hydroxyl value of 112 and an acid value of 15.6).

Preparation Example 14 Preparation of epoxy group-containing resin (7)

Using a reactor equipped with a reflux condenser and a stirrer, a mixture of 400 g of 3,4-epoxycyclohexylmethyl methacrylate, 232 g of hydroxyethyl acrylate, 184 g of butyl methacrylate, 184 g of cyclohexylmethyl acrylate and 10 g of azoisobutyronitrile was added dropwise to 1,000 g of xylene at 110° C. to undergo a reaction for 5 hours, giving an acrylic resin having a number average molecular weight of 10,000 (containing about 20 epoxy groups in one molecule and having a hydroxyl value of 112).

Preparation Example 15 Preparation of acrylic resin (8)

Using a reactor equipped with a reflux condenser and a stirrer, a mixture of 243 g of methacryloxypropyl trimethoxysilane, 232 g of hydroxyethyl acrylate, 263 g of cyclohexylmethyl acrylate, 262 g of butyl methacrylate and 10 g of azoisobutyronitrile was added dropwise to 1,000 g of xylene at 110° C. to undergo a reaction for 5 hours, giving an acrylic resin having a number average molecular weight of 10,000 (containing about 30 alkoxysilyl groups in one molecule and having a hydroxyl value of 112).

Preparation Example 16 Preparation of acrylic resin (9)

Using a reactor equipped with a reflux condenser and a stirrer, a mixture of 243 g of methacryloxypropyl trimethoxysilane, 20 g of acrylic acid, 368 g of cyclohexylmethyl acrylate, 369 g of butyl methacrylate and 10 g of azoisobutyronitrile was added dropwise to 1,000 g of xylene at 110° C. to undergo a reaction for 5 hours, giving an acrylic resin having a number average molecular weight of 10,000 (containing about 30 alkoxysilyl groups in one molecule and having an acid value of 15.6).

Preparation Example 17 Preparation of acrylic resin (10)

Using a reactor equipped with a reflux condenser and a stirrer, a mixture of 243 g of methacryloxypropyl trimethoxysilane, 232 g of hydroxyethyl acrylate, 20 g of acrylic acid, 253 g of cyclohexylmethyl acrylate, 252 g of butyl methacrylate and 10 g of azoisobutyronitrile was added dropwise to 1,000 g of xylene at 110° C. to undergo a reaction for 5 hours, giving an acrylic resin having a number average molecular weight of 10,000 (containing about 30 alkoxysilyl groups in one molecule, and having a hydroxyl value of 112 and an acid value of 15.6).

Preparation Example 18 Preparation of acrylic resin (11)

Using a reactor equipped with a reflux condenser and a stirrer, a mixture of 80 g of acrylic acid, 460 g of cyclohexylmethyl acrylate, 460 g of butyl methacrylate and 10 g of azoisobutyronitrile was added dropwise to 1,000 g of xylene at 110° C. to undergo a reaction for 5 hours, giving an acrylic resin having a number average molecular weight of 10,000 (having an acid value of 62).

Preparation Example 19 Preparation of reactive silicon group-containing resin (a)

| | |
|---|---|
| "Coalcoat ES40" | 530 g |
| Benzyl alcohol | 470 g |
| Tris (acetylacetonato) aluminum | 0.1 g |

A mixture of the foregoing components was subjected to a reaction for removing 200 g of ethanol at 160° C. for 6 hours, giving a reactive silicon group-containing resin (a). The resin (a) had an average of about 12 ethoxy groups in one molecule among which 6 ethoxy groups are substituted by

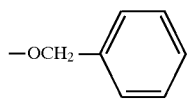

Example 3

The compositions of the present invention and comparative compositions with a make-up shown below in Table 3 were prepared using the compounds prepared in Preparation Examples 8 to 19, "ERL-4221" which is an epoxy group-containing compound, and phenyltrimethoxysilane (hereinafter referred to as "reactive silicon group-containing compound (b)") which is a reactive silicon group-containing compound.

The storage stability, appearance, curability and resistance to yellowing of the curable compositions as the products of the present invention and as the comparative products were evaluated in the same manner as in Example 1. The test results are shown below in Table 3. A mark of "*" in the table represents the use of two or three types in combination.

TABLE 3

| | | Product of the Invention | | | | |
|---|---|---|---|---|---|---|
| Make-up (g) | | 1 | 2 | 3 | 4 | 5 |
| Resin | Type | 1 | 2 | 5/3* | 5/4* | 5 |
| | Amount | 200 | 200 | 100/100* | 100/100* | 200 |
| ERL-4221 | Amount | | | | | 20 |
| Reactive silicon group-containing resin | Type | | | a | a | a |
| | Amount | | | 20 | 20 | 20 |
| Catalyst | | | | | | |
| Butyltin triacetate | | 3 | 3 | 3 | 3 | 3 |
| Butyltin trioctate | | | | | | |
| Butyltin trilaurate | | | | | | |
| Dibutyltin diacetate | | | | | | |
| Boron trifluoroetherate | | | | | | |
| Tris(acetylacetonato)-aluminum | | | | | | |
| Storage stability Properties | | A | A | A | A | A |
| Appearance | | Good | Good | Good | Good | Good |
| Curability | | 96 | 97 | 95 | 88 | 93 |
| Resistance to yellowing | | A | A | A | A | A |

TABLE 3-continued

| | | Product of the Invention | | | | | | |
|---|---|---|---|---|---|---|---|---|
| Make-up (g) | | 6 | 7 | 8 | 9 | 10 | 11 | 12 |
| Resin | Type | 5 | 5 | 5 | 5 | 5 | 6 | 11 |
| | Amount | 200 | 200 | 200 | 200 | 200 | 200 | 200 |
| ERL-4221 | Amount | 20 | 20 | 20 | 20 | 20 | 20 | 20 |
| Reactive silicon group-containing resin | Type | a | a | a | a | b | a | a |
| | Amount | 20 | 20 | 20 | 20 | 20 | 20 | 20 |
| Catalyst | | | | | | | | |
| Butyltin triacetate | | 1.5 | | | | 3 | 3 | 3 |
| Butyltin trioctate | | | 3 | | | | | |
| Butyltin trilaurate | | | | 3 | | | | |
| Dibutyltin diacetate | | | | | 3 | | | |
| Boron trifluoroetherate | | | | | | | | |
| Tris(acetylacetonato)-aluminum | | | | | | | | |
| Storage stability Properties | | A | A | A | B | A | A | A |
| Appearance | | Good | Good | Good | Good | Good | Good | Good |
| Curability | | 90 | 93 | 91 | 83 | 89 | 96 | 89 |
| Resistance to yellowing | | A | A | A | A | A | A | A |

| | | Product of the Invention | | | | | |
|---|---|---|---|---|---|---|---|
| Make-up (g) | | 13 | 14 | 15 | 16 | 17 | 18 |
| Resin | Type | 7 | 8 | 7/8* | 9 | 10 | 6/7* |
| | Amount | 200 | 200 | 100/100* | 200 | 200 | 100/100* |
| ERL-4221 | Amount | | 20 | | 20 | 20 | |
| Reactive silicon group-containing resin | Type | a | | | | | a |
| | Amount | 20 | | | | | 20 |
| Catalyst | | | | | | | |
| Butyltin triacetate | | 3 | 3 | 3 | 3 | 3 | 3 |
| Butyltin trioctate | | | | | | | |
| Butyltin trilaurate | | | | | | | |
| Dibutyltin diacetate | | | | | | | |
| Boron trifluoroetherate | | | | | | | |
| Tris(acetylacetonato)-aluminum | | | | | | | |
| Storage stability Properties | | A | A | A | A | A | A |
| Appearance | | Good | Good | Good | Good | Good | Good |
| Curability | | 96 | 94 | 96 | 91 | 95 | 94 |
| Resistance to yellowing | | A | A | A | A | A | A |

| | | Product of the Invention | | | |
|---|---|---|---|---|---|
| Make-up (g) | | 19 | 20 | 21 | 22 |
| Resin | Type | 6/7* | 6/7/9* | 5/8* | 1/6* |
| | Amount | 100/100* | 80/40/80* | 100/100* | 100/100* |
| ERL-4221 | Amount | | | | |
| Reactive silicon group-containing resin | Type | b | a | a | a |
| | Amount | 20 | 20 | 20 | 20 |
| Catalyst | | | | | |
| Butyltin triacetate | | 3 | 3 | 3 | 3 |
| Butyltin trioctate | | | | | |
| Butyltin trilaurate | | | | | |
| Dibutyltin diacetate | | | | | |

TABLE 3-continued

| | | | | | |
|---|---|---|---|---|---|
| Boron trifluoroetherate | | | | | |
| Tris(acetylacetonato)-aluminum | | | | | |
| Storage stability Properties | A | A | A | A | |
| Appearance | Good | Good | Good | Good | |
| Curability | 91 | 96 | 96 | 96 | |
| Resistance to yellowing | A | A | A | A | |

| | | Comparative Product | | | |
|---|---|---|---|---|---|
| Make-up (g) | | 1 | 2 | 3 | 4 |
| Resin | Type | 1 | 1 | 5 | 5 |
| | Amount | 200 | 200 | 200 | 200 |
| ERL-4221 | Amount | 20 | 20 | | 20 |
| Reactive silicon group-containing resin | Type | | | a | a |
| | Amount | | | 20 | 20 |
| Catalyst | | | | | |
| Butyltin triacetate | | | | | |
| Butyltin trioctate | | | | | |
| Butyltin trilaurate | | | | | |
| Dibutyltin diacetate | | | | | |
| Boron trifluoroetherate | | 3 | | 3 | |
| Tris(acetylacetonato)-aluminum | | | 3 | | 3 |
| Storage stability Properties | | D | C | D | C |
| Appearance | | — | Good | — | Good |
| Curability | | — | 95 | — | 94 |
| Resistance to yellowing | | — | B | — | B |

| | | Product of the Invention | | | | |
|---|---|---|---|---|---|---|
| Make-up (g) | | 23 | 24 | 25 | 26 | 27 |
| Resin | Type | 1 | 2 | 5/3* | 5/4* | 5 |
| | Amount | 200 | 200 | 100/100* | 100/100* | 200 |
| ERL-4221 | Amount | | | | | 20 |
| Reactive silicon group-containing resin | Type | | | a | a | a |
| | Amount | | | 20 | 20 | 20 |
| Catalyst | | | | | | |
| Butylbis(ethylacetoacetate)tin acetate | | 2 | 2 | 2 | 2 | 2 |
| Bis(ethylacetoacetate)-tin diacetate | | | | | | |
| Butylbis(acetylacetonato)-tin octate | | | | | | |
| Bis(acetylacetonato)-tin dioctate | | | | | | |
| Boron trifluoroetherate | | | | | | |
| Butyltin triacetate | | | | | | |
| Tris(acetylacetonato)-aluminum | | | | | | |
| Storage stability Properties | | A | A | A | A | A |
| Appearance | | Good | Good | Good | Good | Good |
| Curability | | 94 | 95 | 93 | 89 | 93 |
| Resistance to yellowing | | A | A | A | A | A |

| | | Product of the Invention | | | | | | |
|---|---|---|---|---|---|---|---|---|
| Make-up (g) | | 28 | 29 | 30 | 31 | 32 | 33 | 34 |
| Resin | Type | 5 | 5 | 5 | 5 | 5 | 6 | 11 |
| | Amount | 200 | 200 | 200 | 200 | 200 | 200 | 209 |
| ERL-4221 | Amount | 20 | 20 | 20 | 20 | 20 | 20 | 20 |
| Reactive silicon group-containing resin | Type | a | a | a | b | a | a | a |
| | Amount | 20 | 20 | 20 | 20 | 20 | 20 | 20 |
| Catalyst | | | | | | | | |
| Butylbis(ethylacetoacetate)tin acetate | | 1 | | | | 2 | 2 | 2 |
| Bis(ethylacetoacetate)-tin diacetate | | | 2 | | | | | |
| Butylbis(acetylacetonato)-tin octate | | | | 2 | | | | |
| Bis(acetylacetonato)-tin dioctate | | | | | 2 | | | |
| Boron trifluoroetherate | | | | | | | | |
| Butyltin triacetate | | | | | | | | |
| Tris(acetylacetonato)-aluminum | | | | | | | | |
| Storage stability Properties | | A | A | A | A | A | A | A |
| Appearance | | Good | Good | Good | Good | Good | Good | Good |
| Curability | | 88 | 93 | 93 | 92 | 88 | 94 | 89 |
| Resistance to yellowing | | A | A | A | A | A | A | A |

| | | Product of the Invention | | | | | |
|---|---|---|---|---|---|---|---|
| Make-up (g) | | 35 | 36 | 37 | 38 | 39 | 40 |
| Resin | Type | 7 | 8 | 7/8* | 9 | 10 | 6/7* |
| | Amount | 200 | 200 | 100/100* | 200 | 200 | 100/100* |
| ERL-4221 | Amount | | 20 | | 20 | 20 | |
| Reactive silicon group-containing resin | Type | a | | | | | a |
| | Amount | 20 | | | | | 20 |
| Catalyst | | | | | | | |
| Butylbis(ethylacetoacetate)tin acetate | | 2 | 2 | 2 | 2 | 2 | 2 |
| Bis(ethylacetoacetate)-tin diacetate | | | | | | | |
| Butylbis(acetylacetonato)-tin octate | | | | | | | |
| Bis(acetylacetonato)-tin dioctate | | | | | | | |
| Boron trifluoroetherate | | | | | | | |
| Butyltin triacetate | | | | | | | |
| Tris(acetylacetonato)-aluminum | | | | | | | |
| Storage stability Properties | | A | A | A | A | A | A |
| Appearance | | Good | Good | Good | Good | Good | Good |
| Curability | | 94 | 93 | 94 | 90 | 93 | 94 |
| Resistance to yellowing | | A | A | A | A | A | A |

| | | Product of the Invention | | | |
|---|---|---|---|---|---|
| Make-up (g) | | 41 | 42 | 43 | 44 |
| Resin | Type | 6/7* | 6/7/9* | 5/8* | 1/6* |
| | Amount | 100/100* | 80/40/80* | 100/100* | 100/100* |
| ERL-4221 | Amount | | 20 | 20 | |
| Reactive silicon group-containing resin | Type | b | a | a | a |
| | Amount | 20 | 20 | 20 | 20 |
| Catalyst | | | | | |
| Butylbis(ethylacetoacetate)tin acetate | | 2 | 2 | 2 | 2 |
| Bis(ethylacetoacetate)-tin diacetate | | | | | |
| Butylbis(acetylacetonato)-tin octate | | | | | |
| Bis(acetylacetonato)-tin dioctate | | | | | |
| Boron trifluoroetherate | | | | | |
| Butyltin triacetate | | | | | |
| Tris(acetylacetonato)- | | | | | |

TABLE 3-continued

| | | | | | |
|---|---|---|---|---|---|
| aluminum | | | | | |
| Storage stability Properties | A | A | A | A | |
| Appearance | Good | Good | Good | Good | |
| Curability | 90 | 94 | 92 | 95 | |
| Resistance to yellowing | A | A | A | A | |

| | | Comparative Product | | | | |
|---|---|---|---|---|---|---|
| Make-up (g) | | 5 | 6 | 7 | 8 | 9 |
| Resin | Type | 1 | 1 | 5 | 5 | 1 |
| | Amount | 200 | 200 | 200 | 200 | 200 |
| ERL-4221 | Amount | | | 20 | 20 | |
| Reactive silicon group-containing resin | Type Amount | | | a 20 | a 20 | |
| Catalyst | | | | | | |
| Butylbis(ethylaceto-acetate)tin acetate | | | | | | |
| Bis(ethylacetoacetate)-tin diacetate | | | | | | |
| Butylbis(acetylacetonato)-tin octate | | | | | | |
| Bis(acetylacetonato)-tin dioctate | | | | | | |
| Boron trifluoroetherate | | 2 | | 2 | | |
| Butyltin triacetate | | | | | | 2 |
| Tris(acetylacetonato)-aluminum | | | 2 | | 2 | |
| Storage stability Properties | | D | C | D | C | B |
| Appearance | | — | Good | — | Good | Good |
| Curability | | — | 94 | — | 93 | 81 |
| Resistance to yellowing | | — | B | — | B | A |

Preparation Example 20 Preparation of reactive silicon group-containing ethylenically unsaturated monomer (1)

| | |
|---|---|
| "Colcoat ES40" | 850 g |
| 2-Hydroxyethyl methacrylate | 150 g |
| Tris(acetylacetonato)aluminum | 0.1 g |
| Hydroquinone | 1 g |

A mixture of the above-mentioned components was heated to 120° C. for 3 hours to remove 53 g of ethanol, giving a reactive silicon group-containing ethylenically unsaturated monomer (1) having an average of one unsaturated bond per molecule.

Preparation Example 21 Preparation of reactive silicon group-containing resin (a-1)

A reactive silicon group-containing resin (a-1) was obtained in the same manner as in Preparation Example 6. The obtained resin had an average of about 10 ethoxy groups and 2 benzyl ether groups in one molecule.

Preparation Example 22 Preparation of reactive silicon group-containing resin (a-2)

| | |
|---|---|
| "Colcoat ES40" | 705 g |
| Hydroxyethyl acetate | 295 g |
| Tris(acetylacetonato)aluminum | 0.1 g |

A mixture of the above-mentioned components was heated to 160° C. for 6 hours to remove 44 g of ethanol, giving a reactive silicon group-containing resin (a-2). The resin (a-2) had an average of about 12 ethoxy groups in one molecule among which 3 ethoxy groups are substituted by

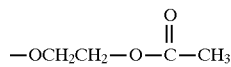

Preparation Example 23 Preparation of reactive silicon group-containing resin (a-3)

Using a reactor equipped with a reflux condenser and a stirrer, a mixture of 243 g of methacryloxypropyl trimethoxysilane, 757 g of butyl methacrylate and 10 g of azoisobutyronitrile was added dropwise to 1,000 g of xylene at 110° C. to undergo a reaction for 5 hours, giving an acrylic resin having a number average molecular weight of 10,000 (containing about 30 methoxy groups in one molecule).

Preparation Example 24 Preparation of reactive silicon group-containing compound (a-4)

Using a reactor equipped with a reflux condenser and a stirrer, a mixture of 380 g of the reactive silicon group-containing ethylenically unsaturated monomer (1), 620 g of butyl methacrylate and 10 g of azoisobutyronitrile was added dropwise to 1,000 g of xylene at 110° C. to undergo a reaction for 5 hours, giving an acrylic resin having a number average molecular weight of 10,000 (containing about 50 ethoxy groups in one molecule).

Preparation Example 25 Preparation of epoxy group-containing resin (b-1)

An acrylic resin having a number average molecular weight of 10,000 (containing about 20 epoxy groups in one molecule) was prepared in the same manner as in Preparation Example 5.

Preparation Example 26 Preparation of epoxy group- and reactive silicon group-containing compound (c-1)

Using a reactor equipped with a reflux condenser and a stirrer, a mixture of 130 g of the reactive silicon group-containing ethylenically unsaturated monomer (1), 220 g of 3,4-epoxycyclohexylmethyl methacrylate, 500 g of cyclohexylmethyl acrylate, 130 g of butyl methacrylate and 10 g of azoisobutyronitrile was added dropwise to 1,000 g of xylene at 110° C. to undergo a reaction for 5 hours, giving an acrylic resin having a number average molecular weight of 10,000 (containing about 11 epoxy groups and about 19 ethoxy groups in one molecule).

Preparation Example 27 Preparation of epoxy group- and reactive silicon group-containing resin (c-2)

An acrylic resin having a number average molecular weight of 10,000 (containing about ii epoxy groups and about 19 methoxy groups in one molecule) was prepared in the same manner as in Preparation Example 3.

Preparation Example 28 Preparation of hydroxyl group-containing resin

| | |
|---|---|
| 2-Hydroxyethyl acrylate | 232 g |
| n-Butyl methacrylate | 618 g |
| Styrene | 150 g |
| Azobisisobutyronitrile | 20 g |

A mixture of the above-mentioned components was added dropwise to 1,000 g of xylene at 110° C. to undergo a reaction for 5 hours, giving an acryl polyol having a number average molecular weight of 20,000. The acryl polyol was a hydroxyl group-containing resin having a hydroxyl value of 112 and an acid value of 0.

Preparation Example 29 Preparation of clear topcoat compositions

Clear topcoat compositions (i-1) to (i-21) were produced according to the proportions of the components shown in Table 4. Among these coating compositions, compositions (i-1) to (i-19) were those produced for the method of the present invention, and compositions (i-20) to (i-22) were those for comparative purpose. The composition (i-22) comprised 80 g of epoxy group-containing resin (b-1) and 20 g of methylenehexahydrophthalic anhydride.

Preparation Example 30 Preparation of colored base coat compositions (ii-1) and (ii-2)

Colored base coat compositions (ii-l) and (ii-2) were prepared according to the proportions of the components shown in Table 4.

steel plate (treated for chemical conversion) to give a coating film of 25 $\mu$m thickness when cured. The coated substrate was heated for curing to 170° C. for 30 minutes, and then "ES Primer Surfacer TP-37"(trademark, product of Kansai Paint Co., Ltd., automotive intercoat composition comprising a polyester resin and a melamine resin) was applied as an intercoat composition to a dry thickness of 30 $\mu$m. The intercoat was heated for curing to 140° C. for 30 minutes. The coating was polished with #400 sand paper using water. Then the wet coating was drained and dried and the coating surface was wiped with petroleum benzine.

TABLE 4

| | | Clear Topcoat Composition | | | | | | | | | | | |
|---|---|---|---|---|---|---|---|---|---|---|---|---|---|
| | | i-1 | i-2 | i-3 | i-4 | i-5 | i-6 | i-7 | i-8 | i-9 | i-10 | i-11 | i-12 |
| Reactive silicon group-containing resin | a-1 | 30 | | | | 30 | | | 30 | 30 | 30 | | |
| | a-2 | | 30 | | | | | | | | | 30 | |
| | a-3 | | | 30 | | | | | | | | | 30 |
| | a-4 | | | | 30 | | | | | | | | |
| Epoxy group-containing resin | b-1 | 70 | 70 | 70 | 70 | | | | 70 | 70 | 70 | 70 | 70 |
| | b-2 | | | | | 70 | | | | | | | |
| Reactive silicon group- and epoxy group-containing resin | c-1 | | | | | | 100 | | | | | | |
| | c-2 | | | | | | | 100 | | | | | |
| Butyltin triacetate | | 2 | 2 | 2 | 2 | 2 | 2 | 2 | | | | | |
| Butyltin trioctate | | | | | | | | | 2 | | | | |
| Butyltin trilaurate | | | | | | | | | | 2 | | | |
| Butylbis (ethylacetoacetate) tin acetate | | | | | | | | | | | 2 | 2 | 2 |
| Bis (ethylacetoacetate) tin diacetate | | | | | | | | | | | | | |
| Butylbis (acetylacetonato) tin octate | | | | | | | | | | | | | |
| Bis (acetylacetonato) tin dioctate | | | | | | | | | | | | | |
| Aluminum paste | | | | | | | | | | | | | |

| | | Clear Topcoat Composition | | | | | | | | | Colored base coat composition | |
|---|---|---|---|---|---|---|---|---|---|---|---|---|
| | | i-13 | i-14 | i-15 | i-16 | i-17 | i-18 | i-19 | i-20 | i-21 | ii-1 | ii-2 |
| Reactive silicon group-containing resin | a-1 | | 30 | | | 30 | 30 | 30 | 30 | | 20 | 20 |
| | a-2 | | | | | | | | | | | |
| | a-3 | | | | | | | | | | | |
| | a-4 | 30 | | | | | | | | | | |
| Epoxy group-containing resin | b-1 | 70 | | | | 70 | 70 | 70 | 70 | | 80 | 80 |
| | b-2 | | 70 | | | | | | | | | |
| Reactive silicon group- and epoxy group-containing resin | c-1 | | | 100 | | | | | | 100 | | |
| | c-2 | | | | 100 | | | | | | | |
| Butyltin triacetate | | | | | | | | | | | 2 | |
| Butyltin trioctate | | | | | | | | | | | | |
| Butyltin trilaurate | | | | | | | | | | | | |
| Butylbis (ethylacetoacetate) tin acetate | 2 | 2 | 2 | 2 | | | | | | | 2 |
| Bis (ethylacetoacetate) tin diacetate | | | | | 2 | | | | | | |
| Butylbis (acetylacetonato) tin octate | | | | | | 2 | | | | | |
| Bis (acetylacetonato) tin dioctate | | | | | | | 2 | | | | |
| Aluminum paste | | | | | | | | | | 8 | 8 |

In Table 4 given above, the amounts are all by grams (on solid basis). An epoxy group-containing resin (b-2) is "ERL-4221" (product of Union Carbide Corp., trade name, alicyclic diepoxy compound) and an aluminum paste was "Alpaste 4919" (trademark, product of Toyo Aluminum K.K., aluminum flake, 65 wt % on solid basis).

A colored base coat composition (ii-3) was prepared by mixing 75 g (on solid basis) of the resin obtained in Preparation Example 28, 25 g of "Uban 20SE" (trademark, product of Mitsui Toatsu Chemicals Inc., butylated melamine resin, 60 wt % on solid basis), and 8 g (on solid basis) of "Alpaste 4919".

Preparation Example 31 Preparation of substrate

A substrate to be coated with the coating composition was prepared as follows. "Elecron No.9400" (trademark, product of Kansai Paint Co., Ltd., epoxy resin-based cationic electrodepositable coating composition) was applied to a dull

EXAMPLE 4

Using the colored base coat compositions and clear topcoat compositions shown below in Table 5, coating operation was carried out by the following procedure according to a 2-coat 1-bake coating method.

The colored base coat composition was adjusted to a coating viscosity of 14 seconds (Ford cup No.4, 20° C., the same meaning hereinafter) and was applied by spray coating to the substrate prepared in Preparation Example 31 to a film thickness of about 15 $\mu$m when dried, thereby forming a colored based coat on the substrate.

Thereafter, the colored base coat was left to stand for 3 minutes, and was sprayed with a clear topcoat composition adjusted with xylol to a coating viscosity of 25 seconds to give a coating film with a dry thickness of about 40 $\mu$m, whereby a clear topcoat was formed on the colored base coat.

Subsequently the colored base coat and the clear topcoat were simultaneously heated for curing to 140° C. for 30 minutes, whereby a finish coat was formed.

Next, the finish coats formed in the above Examples and Comparative Examples were tested for finishing properties (appearance, luster and distinctness-of-image gloss) and for film properties.

Appearance: The coating film was checked for undesirable change of coating surface such as delustering, shrinks, cracking, flaking and opaqueness (turbidity).

Luster: 60° specular reflectivity (%) was determined.

Distinctness-of-image gloss: The distinctness-of-image gloss was measured using "PGD-IV type measuring device" (manufactured by Japan Color Research Institute, measuring device for evaluating distinctness-of-image gloss). The higher the value, the higher the distinctness-of-image gloss.

Solvent resistance: The coating surface was wiped by 10 strokes with a gauze piece soaked with xylol and observed to evaluate the solvent resistance according to the following criteria: A; No change, B; the coating surface has become markedly marred, and C; the coating surface has become swollen and tends to cause blushing.

Adhesion: The coating surface was cut crosswise with a knife to the substrate to make a lattice pattern with 11 cuts, about 1.5 mm wide, in each direction. Cellophane adhesive tape 24 mm wide was applied over the lattice and then removed. The number of coating squares remaining on the substrate was counted and the adhesion was assessed according to the following ratings.

A: The number of remaining squares was 100. B: The number of remaining squares was 99-95. C: The number of remaining squares was 94 or less.

Scratch resistance: The scratch resistance was assessed using a tester for fastness to friction on dyed stuff (manufactured by Daiei Kagakuseiki Seisakusho). A polishing powder (Darma cleanser) was kneaded with water to give a thick paste. The paste was placed on the coating surface, pressed with a tester terminal and reciprocatively rubbed by 25 strokes under a load of 0.5 kg. The scratch resistance was assessed by A-D scale: A; no change compared with the initial gloss, B; slightly delustered compared with the initial gloss, C; delustered compared with the initial gloss, D; strikingly delustered compared with the initial gloss.

Acid resistance: Forty % by weight of aqueous sulfuric acid (0.4 cc) was dripped onto the coating surface, and the wet surface was dehydrated at 75° C. for 15 minutes and washed with water. The depth ($\mu$m) of indents formed by etching due to sulfurinc acid was measured.

Weatherability: The coating film was observed to assess the degree of impairments after being repeatedly subjected to cycles for 2,000 hours, each cycle comprising alternate combination of irradiation (15 minutes) at 40 to 70° C. and condensation (15 minutes), using a QUV weatherometer (ultraviolet fluorescent lamp "No. QFS-40, UV-B", a wavelength of 320 to 280 nm) manufactured by The Q Panel Co.

The test results are shown in Table 5.

TABLE 5

| | Method of the Invention | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Colored base coat composition | ii-3 | ii-3 | ii-3 | ii-3 | ii-3 | ii-3 | ii-3 | ii-3 | ii-3 | ii-3 | ii-3 | ii-3 |
| Clear topcoat composition | i-1 | i-2 | i-3 | i-4 | i-5 | i-6 | i-7 | i-8 | i-9 | i-10 | i-11 | i-12 |
| Finishing properties | | | | | | | | | | | | |
| Appearance | Good | Good | Good | Good | Good | Good | Good | Good | Good | Good | Good | Good |
| Luster | 94 | 93 | 88 | 94 | 95 | 95 | 88 | 95 | 95 | 95 | 94 | 90 |
| Distinctness-of-image gloss | 1.0 | 1.0 | 1.0 | 1.0 | 1.0 | 1.0 | 1.0 | 1.0 | 1.0 | 1.0 | 1.0 | 1.0 |
| Film properties | | | | | | | | | | | | |
| Solvent resistance | A | A | A | A | A | A | A | A | A | A | A | A |
| Adhesion | A | A | A | A | A | A | A | A | A | A | A | A |
| Scratch resistance | B | B | B | B | A | A | B | B | B | B | B | B |
| Acid resistance | 0.8 | 0.9 | 1.0 | 0.8 | 0.7 | 0.7 | 1.0 | 0.6 | 0.7 | 0.7 | 0.8 | 0.9 |
| Weatherability | Good | Good | Good | Good | Good | Good | Good | Good | Good | Good | Good | Good |

| | Method of the Invention | | | | | | | | | Comparative Method | | |
|---|---|---|---|---|---|---|---|---|---|---|---|---|
| | 13 | 14 | 15 | 16 | 17 | 18 | 19 | 20 | 21 | 1 | 2 | 3 |
| Colored base coat composition | ii-3 | ii-3 | ii-3 | ii-3 | ii-3 | ii-3 | ii-3 | ii-1 | ii-2 | ii-3 | ii-3 | ii-3 |
| Clear topcoat composition | i-13 | i-14 | i-15 | i-16 | i-17 | i-18 | i-19 | i-1 | i-1 | i-20 | i-21 | i-22 |
| Finishing properties | | | | | | | | | | | | |
| Appearance | Good | Good | Good | Good | Good | Good | Good | Good | Good | Good | Good | Good |
| Luster | 95 | 97 | 96 | 95 | 95 | 97 | 96 | 93 | 93 | 95 | 94 | 85 |
| Distinctness-of-image gloss | 1.0 | 1.0 | 1.0 | 1.0 | 1.0 | 1.0 | 1.0 | 1.0 | 1.0 | 1.0 | 1.0 | 0.8 |
| Film properties | | | | | | | | | | | | |
| Solvent resistance | A | A | A | A | A | A | A | A | A | B | B | B |
| Adhesion | A | A | A | A | A | A | A | A | A | B | B | A |

TABLE 5-continued

| Scratch resistance | B | A | A | B | B | B | B | B | B | D | D | C |
|---|---|---|---|---|---|---|---|---|---|---|---|---|
| Acid resistance | 0.7 | 0.5 | 0.6 | 0.7 | 0.7 | 0.5 | 0.6 | 0.8 | 0.8 | 9.0 | 9.2 | 3.5 |
| Weatherability | Good | Good | Good | Good | Good | Good | Good | Good | Good | DL | DL | Good |

Note: DL = delustered

Preparation Example 32 Preparation of clear topcoat compositions (a-1) to (a-39)

Clear topcoat compositions were prepared using the compounds prepared in Preparation Examples 8–19, "ERL-4221", i.e. epoxy group-containing compounds (product of Union Carbide Corp., trade name, alicyclic diepoxy compound), phenyltrimethoxysilane, i.e. reactive silicon group-containing compound (hereinafter referred to as reactive silicon group-containing compound (b)") according to the proportions of components shown in Table 6 (on solid basis). A mark of * in the table represents the use of two types or three types in combination.

Preparation Example 33 Preparation of colored base coat compositions (b-1) to (b-5)

Colored base coat compositions were prepared according to the proportions of the components shown in Table 7 (on solid basis). The melamine resin indicated in Table 7 is "Uban 20SE" (trademark, product of Mitsui Toatsu Chemicals Ind., butylated melamine resin, 60 wt % on solid basis). An aluminum paste is "Alpaste 4919" (trademark, product of Toyo Aluminum K.K., aluminum flake, 65 wt % on solid basis).

TABLE 6

| Make-up (g) | | Clear topcoat composition | | | | |
|---|---|---|---|---|---|---|
| | | a-1 | a-2 | a-3 | a-4 | a-5 |
| Resin | Type | 1 | 2 | 5/3* | 5/4* | 5 |
| | Amount | 100 | 100 | 50/50* | 50/50* | 100 |
| ERL-4221 | Amount | | | | | 20 |
| Reactive silicon group-containing resin | Type | | | a | a | a |
| | Amount | | | 20 | 20 | 20 |
| Catalyst | | | | | | |
| Butyltin triacetate | | 2 | 2 | 2 | 2 | 2 |
| Butyltin trioctate | | | | | | |
| Butyltin trilaurate | | | | | | |
| Butylbis(ethylaceto-acetate)tin acetate | | | | | | |
| Bis(ethylacetoacetate)tin diacetate | | | | | | |
| Butylbis(acetylacetonato)-tin octate | | | | | | |
| Bis(acetylacetonato)tin dioctate | | | | | | |
| Tris(acetylacetonato)-aluminum | | | | | | |

| Make-up (g) | | Clear topcoat composition | | | | | |
|---|---|---|---|---|---|---|---|
| | | a-6 | a-7 | a-8 | a-9 | a-10 | a-11 |
| Resin | Type | 5 | 5 | 5 | 5 | 6 | 11 |
| | Amount | 100 | 100 | 100 | 100 | 100 | 100 |
| ERL-4221 | Amount | 20 | 20 | 20 | 20 | 20 | 20 |
| Reactive silicon group-containing resin | Type | a | a | a | b | a | a |
| | Amount | 20 | 20 | 20 | 20 | 20 | 20 |
| Catalyst | | | | | | | |
| Butyltin triacetate | | 1 | | | 2 | 2 | 2 |
| Butyltin trioctate | | | 2 | | | | |
| Butyltin trilaurate | | | | 2 | | | |

TABLE 6-continued

| Butylbis(ethylaceto-acetate)tin acetate | | | | | | | |
| Bis(ethylacetoacetate)tin diacetate | | | | | | | |
| Butylbis(acetylacetonato)-tin octate | | | | | | | |
| Bis(acetylacetonato)tin dioctate | | | | | | | |
| Tris(acetylacetonato)-aluminum | | | | | | | |

| Make-up (g) | | Clear topcoat composition | | | | | |
|---|---|---|---|---|---|---|---|
| | | a-12 | a-13 | a-14 | a-15 | a-16 | a-17 |
| Resin | Type | 7 | 8 | 7/8* | 9 | 10 | 6/7* |
| | Amount | 100 | 100 | 50/50* | 100 | 100 | 50/50* |
| ERL-4221 | Amount | | | 20 | | 20 | 20 |
| Reactive silicon group-containing resin | Type | | | a | | | a |
| | Amount | | | 20 | | | 20 |
| Catalyst | | | | | | | |
| Butyltin triacetate | | 2 | 2 | 2 | 2 | 2 | 2 |
| Butyltin trioctate | | | | | | | |
| Butyltin trilaurate | | | | | | | |
| Butylbis(ethylaceto-acetate)tin acetate | | | | | | | |
| Bis(ethylacetoacetate)tin diacetate | | | | | | | |
| Butylbis(acetylacetonato)-tin octate | | | | | | | |
| Bis(acetylacetonato)tin dioctate | | | | | | | |
| Tris(acetylacetonato)-aluminum | | | | | | | |

| Make-up (g) | | Clear topcoat composition | | | | |
|---|---|---|---|---|---|---|
| | | a-18 | a-19 | a-20 | a-21 | a-22 |
| Resin | Type | 6/7* | 6/7/9* | 5/8* | 1/6* | 1 |
| | Amount | 50/50* | 40/20/40* | 50/50* | 50/50* | 100 |
| ERL-4221 | Amount | | 20 | 20 | | |
| Reactive silicon group-containing resin | Type | b | a | a | a | |
| | Amount | 20 | 20 | 20 | 20 | |
| Catalyst | | | | | | |
| Butyltin triacetate | | 2 | 2 | 2 | 2 | |
| Butyltin trioctate | | | | | | |
| Butyltin trilaurate | | | | | | |
| Butylbis(ethylaceto-acetate)tin acetate | | | | | | 2 |
| Bis(ethylacetoacetate)tin diacetate | | | | | | |
| Butylbis(acetylacetonato)-tin octate | | | | | | |
| Bis(acetylacetonato)tin dioctate | | | | | | |
| Tris(acetylacetonato)-aluminum | | | | | | |

TABLE 6-continued

|  |  | Clear topcoat composition | | | | |
|---|---|---|---|---|---|---|
| Make-up (g) |  | a-23 | a-24 | a-25 | a-26 | a-27 |
| Resin | Type | 5/3* | 5 | 6 | 11 | 7 |
|  | Amount | 50/50* | 100 | 100 | 100 | 100 |
| ERL-4221 | Amount |  | 20 | 20 | 20 |  |
| Reactive silicon group-containing resin | Type | a | a | a | a | a |
|  | Amount | 20 | 20 | 20 | 20 | 20 |
| Catalyst |  |  |  |  |  |  |
| Butyltin triacetate |  |  |  |  |  |  |
| Butyltin trioctate |  |  |  |  |  |  |
| Butyltin trilaurate |  |  |  |  |  |  |
| Butylbis(ethylaceto-acetate)tin acetate |  | 2 | 2 | 2 | 2 | 2 |
| Bis(ethylacetoacetate)tin diacetate |  |  |  |  |  |  |
| Butylbis(acetylacetonato)-tin octate |  |  |  |  |  |  |
| Bis(acetylacetonato)tin dioctate |  |  |  |  |  |  |
| Tris(acetylacetonato)-aluminum |  |  |  |  |  |  |

|  |  | Clear topcoat composition | | | | |
|---|---|---|---|---|---|---|
| Make-up (g) |  | a-28 | a-29 | a-30 | a-31 | a-32 |
| Resin | Type | 8 | 7/8* | 9 | 10 | 6/7* |
|  | Amount | 100 | 50/50* | 100 | 100 | 50/50* |
| ERL-4221 | Amount | 20 |  |  | 20 | 20 |
| Reactive silicon group-containing resin | Type |  |  |  |  | a |
|  | Amount |  |  |  |  | 20 |
| Catalyst |  |  |  |  |  |  |
| Butyltin triacetate |  |  |  |  |  |  |
| Butyltin trioctate |  |  |  |  |  |  |
| Butyltin trilaurate |  |  |  |  |  |  |
| Butylbis(ethylaceto-acetate)tin acetate |  | 2 | 2 | 2 | 2 | 2 |
| Bis(ethylacetoacetate)tin diacetate |  |  |  |  |  |  |
| Butylbis(acetylacetonato)-tin octate |  |  |  |  |  |  |
| Bis(acetylacetonato)tin dioctate |  |  |  |  |  |  |
| Tris(acetylacetonato)-aluminum |  |  |  |  |  |  |

|  |  | Clear topcoat composition | | | |
|---|---|---|---|---|---|
| Make-up (g) |  | a-33 | a-34 | a-35 | a-36 |
| Resin | Type | 6/7/9* | 1/6* | 1/6* | 1/6* |
|  | Amount | 40/20/40* | 50/50* | 50/50* | 50/50* |
| ERL-4221 | Amount | 20 |  |  |  |
| Reactive silicon group-containing resin | Type | a | a | a | a |
|  | Amount | 20 | 20 | 20 | 20 |
| Catalyst |  |  |  |  |  |
| Butyltin triacetate |  |  |  |  |  |
| Butyltin trioctate |  |  |  |  |  |
| Butyltin trilaurate |  |  |  |  |  |
| Butylbis(ethylaceto-acetate)tin acetate |  | 2 | 2 |  |  |
| Bis(ethylacetoacetate)tin diacetate |  |  |  | 2 |  |
| Butylbis(acetylacetonato)-tin octate |  |  |  |  | 2 |
| Bis(acetylacetonato)tin dioctate |  |  |  |  |  |
| Tris(acetylacetonato)-aluminum |  |  |  |  |  |

TABLE 6-continued

|  |  | Clear topcoat composition | | |
|---|---|---|---|---|
| Make-up (g) |  | a-37 | a-38 | a-39 |
| Resin | Type | 1/6* | 11 | 1 |
|  | Amount | 50/50* | 100 | 100 |
| ERL-4221 | Amount |  | 20 |  |
| Reactive silicon group-containing resin | Type | a |  |  |
|  | Amount | 20 |  |  |
| Catalyst |  |  |  |  |
| Butyltin triacetate |  |  |  |  |
| Butyltin trioctate |  |  |  |  |
| Butyltin trilaurate |  |  |  |  |
| Butylbis(ethylaceto acetate)tin acetate |  |  |  |  |
| Bis(ethylacetoacetate)tin diacetate |  |  |  |  |
| Butylbis(acetylacetonato)-tin octate |  |  |  |  |
| Bis(acetylacetonato)tin dioctate |  | 2 |  |  |
| Tris(acetylacetonato)-aluminum |  |  |  | 2 |

TABLE 7

|  |  | Colored base coat composition | | | | |
|---|---|---|---|---|---|---|
| Make-up (g) |  | b-1 | b-2 | b-3 | b-4 | b-5 |
| Resin | Type | 5 | 6 | 6 | 6 | 6 |
|  | Amount | 100 | 100 | 100 | 100 | 100 |
| ERL-4221 | Amount |  | 20 | 20 | 20 | 20 |
| Reactive silicon group-containing resin | Type |  | a | a | a | a |
|  | Amount |  | 20 | 20 | 20 | 20 |
| Melamine resin |  | 43 |  |  |  |  |
| Aluminum paste |  | 8 | 8 | 8 | 8 | 8 |
| Catalyst |  |  |  |  |  |  |
| Butyltin triacetate |  |  | 3 |  |  |  |
| Butyltin trioctate |  |  |  | 3 |  |  |
| Butylbis(ethylaceto-acetate)tin acetate |  |  |  |  | 3 |  |
| Butylbis(acetylacetonato)-tin octate |  |  |  |  |  | 3 |

Example 5

Finish coats were formed by a 2-coat 1-bake coating method in the same manner as in Example 4 using the colored base coat compositions and clear topcoat compositions shown in Table 8.

Next, the finish coats in the Examples and Comparative Examples were tested for finishing properties (appearance, luster and distinctness-of-image gloss) and for film properties.

The test results are shown in Table 8.

TABLE 8

|  | Method of the Invention | | | | | | | | | | | |
|---|---|---|---|---|---|---|---|---|---|---|---|---|
|  | 1 | 2 | 3 | 4 | 5 | 6 | 7 | 8 | 9 | 10 | 11 | 12 |
| Colored base coat composition | b-1 | b-1 | b-1 | b-1 | b-1 | b-1 | b-1 | b-1 | b-1 | b-1 | b-1 | b-1 |
| Clear topcoat composition | a-1 | a-2 | a-3 | a-4 | a-5 | a-6 | a-7 | a-8 | a-9 | a-10 | a-11 | a-12 |
| Finishing properties |  |  |  |  |  |  |  |  |  |  |  |  |
| Appearance | Good | Good | Good | Good | Good | Good | Good | Good | Good | Good | Good | Good |
| Luster | 97 | 98 | 98 | 96 | 98 | 97 | 98 | 98 | 89 | 98 | 97 | 98 |
| Distinctness-of-image gloss | 1.0 | 1.0 | 1.0 | 1.0 | 1.0 | 1.0 | 1.0 | 1.0 | 1.0 | 1.0 | 1.0 | 1.0 |
| Film properties |  |  |  |  |  |  |  |  |  |  |  |  |
| Solvent resistance | A | A | A | A | A | A | A | A | A | A | A | A |
| Adhesion | A | A | A | A | A | A | A | A | A | A | A | A |
| Scratch resistance | B | B | B | B | B | B | B | B | B | B | B | B |
| Acid resistance | 0.5 | 0.4 | 0.4 | 0.6 | 0.4 | 0.5 | 0.4 | 0.4 | 0.8 | 0.3 | 0.4 | 0.4 |
| Weatherability | Good | Good | Good | Good | Good | Good | Good | Good | Good | Good | Good | Good |

|  | Method of the Invention | | | | | | | | | | | |
|---|---|---|---|---|---|---|---|---|---|---|---|---|
|  | 13 | 14 | 15 | 16 | 17 | 18 | 19 | 20 | 21 | 22 | 23 | 24 |
| Colored base coat composition | b-1 | b-1 | b-1 | b-1 | b-1 | b-1 | b-1 | b-1 | b-1 | b-1 | b-1 | b-1 |
| Clear topcoat composition | a-13 | a-14 | a-15 | a-16 | a-17 | a-18 | a-19 | a-20 | a-21 | a-22 | a-23 | a-24 |
| Finishing properties |  |  |  |  |  |  |  |  |  |  |  |  |
| Appearance | Good | Good | Good | Good | Good | Good | Good | Good | Good | Good | Good | Good |
| Luster | 96 | 97 | 96 | 98 | 98 | 90 | 98 | 96 | 98 | 97 | 98 | 98 |
| Distinctness-of-image gloss | 1.0 | 1.0 | 1.0 | 1.0 | 1.0 | 1.0 | 1.0 | 1.0 | 1.0 | 1.0 | 1.0 | 1.0 |
| Film properties |  |  |  |  |  |  |  |  |  |  |  |  |
| Solvent resistance | A | A | A | A | A | A | A | A | A | A | A | A |
| Adhesion | A | A | A | A | A | A | A | A | A | A | A | A |
| Scratch resistance | B | B | B | A | A | B | A | B | A | B | B | B |
| Acid resistance | 0.4 | 0.4 | 0.5 | 0.3 | 0.3 | 0.6 | 0.3 | 0.5 | 0.3 | 0.5 | 0.4 | 0.4 |
| Weatherability | Good | Good | Good | Good | Good | Good | Good | Good | Good | Good | Good | Good |

|  | Method of the Invention | | | | | | | | | | | |
|---|---|---|---|---|---|---|---|---|---|---|---|---|
|  | 25 | 26 | 27 | 28 | 29 | 30 | 31 | 32 | 33 | 34 | 35 | 36 |
| Colored base coat composition | b-1 | b-1 | b-1 | b-1 | b-1 | b-1 | b-1 | b-1 | b-1 | b-1 | b-1 | b-1 |
| Clear topcoat composition | a-25 | a-26 | a-27 | a-28 | a-29 | a-30 | a-31 | a-32 | a-33 | a-34 | a-35 | a-36 |
| Finishing properties |  |  |  |  |  |  |  |  |  |  |  |  |
| Appearance | Good | Good | Good | Good | Good | Good | Good | Good | Good | Good | Good | Good |
| Luster | 98 | 97 | 98 | 96 | 97 | 96 | 98 | 98 | 98 | 98 | 98 | 98 |
| Distinctness-of-image gloss | 1.0 | 1.0 | 1.0 | 1.0 | 1.0 | 1.0 | 1.0 | 1.0 | 1.0 | 1.0 | 1.0 | 1.0 |
| Film properties |  |  |  |  |  |  |  |  |  |  |  |  |
| Solvent resistance | A | A | A | A | A | A | A | A | A | A | A | A |
| Adhesion | A | A | A | A | A | A | A | A | A | A | A | A |
| Scratch resistance | A | B | B | B | B | B | A | A | A | A | A | A |
| Acid resistance | 0.3 | 0.4 | 0.4 | 0.4 | 0.4 | 0.5 | 0.3 | 0.3 | 0.3 | 0.3 | 0.3 | 0.3 |
| Weatherability | Good | Good | Good | Good | Good | Good | Good | Good | Good | Good | Good | Good |

|  | Method of the Invention | | | | | Comparative Method | |
|---|---|---|---|---|---|---|---|
|  | 37 | 38 | 39 | 40 | 41 | 1 | 2 |
| Colored base coat composition | b-1 | b-2 | b-3 | b-4 | b-5 | b-1 | b-1 |
| Clear topcoat composition | a-37 | a-5 | a-5 | a-5 | a-5 | a-38 | a-39 |
| Finishing properties |  |  |  |  |  |  |  |
| Appearance | Good | Good | Good | Good | Good | Good | Yellowed |
| Luster | 97 | 97 | 96 | 97 | 96 | 98 | 96 |

TABLE 8-continued

| Distinctness-of-image gloss | 1.0 | 1.0 | 1.0 | 1.0 | 1.0 | 1.0 | 1.0 |
|---|---|---|---|---|---|---|---|
| Film properties | | | | | | | |
| Solvent resistance | A | A | A | A | A | DL | A |
| Adhesion | A | A | A | A | A | A | A |
| Scratch resistance | A | B | B | B | B | C | B |
| Acid resistance | 0.3 | 0.5 | 0.5 | 0.5 | 0.5 | 9.2 | 1.0 |
| Weatherability | Good | Good | Good | Good | Good | DL | Good |

Note: DL = delustered

We claim:

1. A thermosetting composition comprising (A) a compound (A-3) containing (i) an epoxy group or groups, (ii) a reactive silicon group or groups and (iii) a hydroxyl group or groups and/or a carboxyl group or groups as essential functional group components in the same molecule, or a mixture (A-4) of at least two types of compounds, each compound containing at least one member selected from the class consisting of functional group components (i), (ii) and (iii), and all of the functional group components (i), (ii) and (iii) being present in said mixture, and (B) an organic chelate catalyst which contains organic chelating group attached to a tetravalent tin atom, the number of the attached chelating group being not more than the valence of the atom and the organic chelating group being a compound which can constitute a keto-enol tautomer.

2. The thermosetting composition according to claim 1, wherein the compound (A-3) is a compound having a number average molecular weight of about 200 to about 100,000.

3. The thermosetting composition according to claim 2, wherein the compound (A-3) is a copolymer prepared by radical copolymerization reaction of an epoxy group-containing ethylenically unsaturated monomer (a), a reactive silicon group-containing ethylenically unsaturated monomer (b), a hydroxyl group-containing ethylenically unsaturated monomer (d) and/or a carboxyl group-containing ethylenically unsaturated monomer (e), and an optional other ethylenically unsaturated monomer (c).

4. The thermosetting composition according to claim 1, wherein the mixture (A-4) is any one of the following mixtures (I) to (IV):

(I) a mixture of an epoxy group-containing compound and a reactive silicon group-containing compound, hydroxyl group or groups and/or carboxyl group or groups being present in at least one of the epoxy group-containing compound and the reactive silicon group-containing compound;

(II) a mixture of an epoxy group-containing compound, a reactive silicon group-containing compound and a hydroxyl group- and/or carboxyl group-containing compound;

(III) a mixture of an epoxy group-containing compound, a reactive silicon group-containing compound and a hydroxyl group- and/or carboxyl group-containing compound, hydroxyl group or groups and/or carboxyl group or groups being present in at least one of the epoxy group-containing compound and the reactive silicon group-containing compound; and (IV) a mixture of an epoxy group- and reactive silicon group-containing compound and a hydroxyl group- and/or carboxyl group-containing compound.

5. The thermosetting composition according to claim 4, wherein the mixture (A-4) is (I) a mixture of an epoxy group-containing compound and a reactive silicon group-containing compound, hydroxyl group or groups and/or carboxyl group or groups being present in at least one of the epoxy group-containing compound and the reactive silicon group-containing compound, or (II) a mixture of an epoxy group-containing compound, a reactive silicon group-containing compound and a hydroxyl group- and/or carboxyl group-containing compound.

6. The thermosetting composition according to claim 1, 2, 3, 4 or 5, wherein the organotin chelate catalyst is a compound represented by the formula

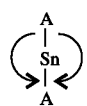

wherein A is the same or different and represents $R^7$, $OR^8$ or $SR^9$,

represents a chelate ring structure formed by the organic chelating agent, $R^7$ is the same or different and represents a monovalent hydrocarbon group having 1 to 20 carbon atoms, $R^8$ is the same or different and represents a monovalent hydrocarbon group having 1 to 20 carbon atoms, a group —COCH=CHCOOR$^7$ or

and $R^9$ is the same or different and represents a monovalent hydrocarbon group having 1 to 20 carbon atoms or a group —C$_v$H$_{2v}$COOR$^7$ in which v is an integer of 1 to 4.

7. The thermosetting composition according to claim 6, wherein the organotin chelate catalyst is at least one compound selected from the group consisting of monobutylbis(ethylacetoacetate)tin acetate, monobutylbis(acetylacetonato)tin octate, monobutylbis(ethylacetoacetate)tin laurate, bis(propylacetoacetate)tin diacetate, bis(propylacetoacetate)tin dilaurate, bis(acetylacetonato)tin diacetate, bis(acetylacetonato)tin dioctate, bis(acetylacetonato)tin dilaurate, bis(ethylacetoacetate)tin dioctate, bis(ethylacetoacetate)tin diacetate, bis(ethylacetoacetate)tin dilaurate and bis(propylacetoacetate)tin dioctate.

8. The thermosetting composition according to claim 1 which contains about 0.001 to about 20 parts by weight of the organotin catalyst (B) per 100 parts by weight of the compound (A-3) or the mixture (A-4) as the component (A).

9. A method of forming a finish coat, the method comprising the steps of forming a colored base coat on a substrate and forming a clear topcoat, the method being characterized in that the colored base coat and/or the clear topcoat is formed from a curable coating composition comprising, as the essential components, (A) a compound (A-3) containing (i) an epoxy group or groups, (ii) a reactive silicon group or groups and (iii) a hydroxyl group or groups and/or a carboxyl group or groups as essential functional group components in the same molecule, or a mixture (A-4) of at least two types of compounds, each compound containing at least one member selected from the class consisting of the functional group components (i), (ii) and (iii), and all of the functional group components (i), (ii) and (iii) being present in said mixture, (B) an organotin catalyst which contains organic chelating groups attached to a tetravalent tin atom, the number of the attached chelating group being not more than the valence of the atom, and the organic chelating group being a compound which can constitute a keto-enol tautomer, and (C) an organic solvent.

10. The method according to claim 9, wherein the colored base coat is formed from a coating composition comprising a coloring pigment and a curable composition selected from the group consisting of acrylic resin/amino resin composition, alkyd resin/amino resin composition, polyester resin/amino resin composition, acrylic resin/polyisocyanate composition, alkyd resin/polyisocyanate and polyester resin/polyisocyanate composition, and wherein the clear topcoat is formed from a curable coating composition comprising, as the essential components, (A) a compound (A-3) containing (i) an epoxy group or groups, (ii) a reactive silicon group or groups and (iii) a hydroxyl group or groups and/or a carboxyl group or groups as essential functional group components in the same molecule, or a mixture (A-4) of at least two types of compounds, each compound containing at least two types of compounds, each compound containing at least one member selected from the class consisting of the functional group components (i), (ii) and (iii), and all of the functional group components (i), (ii) and (iii) being present in said mixture, (B) an organotin catalyst which contains organic chelating group attached to a tetravalent tin atom, the number of the attached chelating group being not more than the valence of the atom, and the organic chelating group being a compound which can constitute a keto-enol tautomer, and (C) an organic solvent.

* * * * *